(12) United States Patent
Tan et al.

(10) Patent No.: US 10,080,124 B2
(45) Date of Patent: Sep. 18, 2018

(54) METHODS AND APPARATUS FOR CLUSTER MANAGEMENT IN DSRC COOPERATIVE SAFETY SYSTEMS

(71) Applicant: QUALCOMM Incorporated, San Diego, CA (US)

(72) Inventors: Bo Tan, San Francisco, CA (US); Xinzhou Wu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/754,634

(22) Filed: Jun. 29, 2015

(65) Prior Publication Data
US 2016/0381538 A1  Dec. 29, 2016

(51) Int. Cl.
| | |
|---|---|
| *H04W 4/02* | (2018.01) |
| *H04W 4/08* | (2009.01) |
| *H04W 88/04* | (2009.01) |
| *H04W 4/90* | (2018.01) |
| *H04W 4/80* | (2018.01) |
| *H04W 76/14* | (2018.01) |

(52) U.S. Cl.
CPC ............ *H04W 4/90* (2018.02); *H04W 4/027* (2013.01); *H04W 4/08* (2013.01); *H04W 4/80* (2018.02); *H04W 76/14* (2018.02); *H04W 88/04* (2013.01)

(58) Field of Classification Search
CPC ....... H04W 4/22; H04W 4/027; H04W 4/008; H04W 4/08; H04W 88/04; H04W 4/90; H04W 4/80; H04W 76/14
USPC ....................... 455/41.2, 404.1–404.2, 412.2, 455/414.1–414.2, 418–420, 456.1–457
See application file for complete search history.

(56) References Cited

U.S. PATENT DOCUMENTS

| | | |
|---|---|---|
| 8,600,411 B2 | 12/2013 | Subramanian et al. |
| 8,886,782 B2 | 11/2014 | Lucero et al. |

(Continued)

FOREIGN PATENT DOCUMENTS

WO   2013112565 A1   8/2013

OTHER PUBLICATIONS

Clustering Based Multichannel MAC Protocols for QoS Provisionings Over Vehicular Ad Hoc Networks Hang Su and Xi Zhang, Senior Member, IEEE IEEE Transactions on Vehicular Technology, vol. 56, No. 6, Nov. 2007.*

(Continued)

*Primary Examiner* — Michael Mapa
(74) *Attorney, Agent, or Firm* — Steven R. Thiel; Arent Fox

(57) ABSTRACT

A method, an apparatus, and a computer program product for wireless communication are provided. The apparatus may be a UE. The apparatus receives a safety message from a second UE. The received safety message includes a cluster indicator that indicates whether the received safety message is a first safety message type or a second safety message type. The first safety message type is associated with a single UE and the second safety message type is associated with multiple UEs. The apparatus determines whether the received safety message is the first safety message type or the second safety message type based on the cluster indicator included in the safety message. The apparatus determines whether a proximity condition between the apparatus and the second UE is satisfied based on the received safety message.

21 Claims, 20 Drawing Sheets

(56) References Cited

U.S. PATENT DOCUMENTS

| | | | | |
|---|---|---|---|---|
| 2003/0147386 A1* | 8/2003 | Zhang | .................... | H04L 12/185 |
| | | | | 370/390 |
| 2004/0018839 A1* | 1/2004 | Andric | ................ | H04L 12/2856 |
| | | | | 455/433 |
| 2007/0027610 A1* | 2/2007 | Parikh | ...................... | G08G 1/20 |
| | | | | 701/117 |
| 2009/0303902 A1* | 12/2009 | Liu | ........................ | H04L 12/189 |
| | | | | 370/254 |
| 2010/0153578 A1* | 6/2010 | Van Gassel | ........... | H04L 65/607 |
| | | | | 709/231 |
| 2013/0179056 A1* | 7/2013 | Fukuyama | ............ | G08G 1/0112 |
| | | | | 701/117 |
| 2013/0267239 A1 | 10/2013 | Stancanelli et al. | | |
| 2014/0057645 A1* | 2/2014 | Chowdhary | ............ | H04W 4/08 |
| | | | | 455/456.1 |
| 2014/0219209 A1* | 8/2014 | Soneda | ................. | H04W 40/30 |
| | | | | 370/329 |
| 2014/0328241 A1* | 11/2014 | Subramanian | ...... | H04W 72/005 |
| | | | | 370/312 |
| 2015/0035685 A1 | 2/2015 | Strickland et al. | | |

OTHER PUBLICATIONS

3GPP TR 22.885: "3rd Generation Partnership Project, Technical Specification Group Services and System Aspects, Study on LTE Support for V2X Services (Release 14)", 3GPP Draft, S1-151330, V0.2.0, 3rd Generation Partnership Project (3GPP), Mobile Competence Centre, 650, Route Des Lucioles, F-06921 Sophia-Antipolis Cedex, France, Apr. 23, 2015 (Apr. 23, 2015), XP050961032, pp. 1-33, Retrieved from the Internet: URL: http://www.3gpp.org/ftp/tsg_sa/WG1_Serv/TSGS1_70_Los_Cabos/Docs/ [retrieved on Apr. 23, 2015] sections 4 and 5, in particular subsections 5.5, 5.14, 5.17 and 5.18.

International Search Report and Written Opinion—PCT/US2016/035076—ISA/EPO—dated Aug. 24, 2016.

Su H., et al., "Clustering-Based Multichannel MAC Protocols for QoS Provisionings Over Vehicular Ad Hoc Networks", IEEE Transactions On Vehicular Technology, Ieee Service Center, Piscataway, NJ, US, vol. 56, No. 6, Nov. 2007 (Nov. 2007), pp. 3309-3323, XP011194799, ISSN: 0018-9545, DOI: 10.1109/TVT.2007.907233 Abstract; sections I.-VII.

* cited by examiner

METHODS AND APPARATUS FOR CLUSTER MANAGEMENT IN DSRC COOPERATIVE SAFETY SYSTEMS

BACKGROUND

Field

The present disclosure relates generally to communication systems, and more particularly, to cluster management in dedicated short-range communications (DSRC) cooperative safety systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be a user equipment (UE). In one aspect, the apparatus receives a safety message from a second UE. The received safety message includes a cluster indicator that indicates whether the received safety message is a first safety message type or a second safety message type. The first safety message type is associated with a single UE and the second safety message type is associated with multiple UEs. The apparatus determines whether the received safety message is the first safety message type or the second safety message type based on the cluster indicator included in the safety message. The apparatus determines whether a proximity condition between the apparatus and the second UE is satisfied based on the received safety message.

In another aspect, the apparatus includes means for receiving a safety message from a second UE. The received safety message includes a cluster indicator that indicates whether the received safety message is a first safety message type or a second safety message type. The first safety message type is associated with a single UE and the second safety message type is associated with multiple UEs. The apparatus includes means for determining whether the received safety message is the first safety message type or the second safety message type based on the cluster indicator included in the safety message. The apparatus includes means for determining whether a proximity condition between the apparatus and the second UE is satisfied based on the received safety message. In an instance, the first safety message type includes location information and motion information for the single UE, and the second safety message type includes at least one of a cluster shape field, a cluster size field, or a cluster population field. The cluster shape field, the cluster size field, and the cluster population field of the second safety message type are associated with multiple UEs. In another instance, the first safety message type includes a clustering control field that includes a leader UE identifier associated with a leader UE of a cluster of UEs and an indicator indicating an intention to join or to leave the cluster of UEs. In another instance, the second safety message type includes a leader UE identifier associated with a leader of a cluster of UEs, cluster location information, or cluster motion information. In another instance, the second safety message type includes a special group indicator field that indicates whether the received safety message is associated with a group of senior citizens, a group of children, a group of users with disabilities, or a group of emergency personnel. In another instance, the means for determining whether the proximity condition between the first UE and the second UE is satisfied is configured to determine whether a distance between the apparatus and the second UE is less than a threshold and to determine a relative motion between the apparatus and the second UE. In another instance, the apparatus includes means for determining a mode of the apparatus, in which the mode is a standalone mode or a cluster member mode. In another instance, the apparatus includes means for determining to join a cluster of UEs associated with the second UE based on the determined mode of the apparatus and the determination of whether the proximity condition is satisfied. The received safety message is the second safety message type and the second UE is a leader UE of the cluster of UEs. In this instance, the apparatus includes means for transmitting a second safety message based on the determination to join the cluster of UEs. The second safety message is the first safety message type and includes a clustering control field that includes an identifier associated with the second UE and an indicator indicating an intention to join the cluster of UEs associated with the second UE. In another instance, the apparatus includes means for determining, based on the determined mode of the apparatus, whether an identifier in the received safety message matches a leader UE identifier associated with a cluster of UEs. The apparatus is a member of the cluster of UEs and the received safety message is the second safety message type. In this instance, the apparatus includes means for storing information related to determining whether the proximity condition is satisfied based on the determination of whether the identifier matches the leader UE identifier. In this instance, the apparatus includes means for determining whether to leave the cluster of UEs based on the determination of whether the proximity condition is satisfied and based on the determination of whether the identifier matches the leader UE identifier. In another instance, the apparatus includes means for transmitting a second safety message based on the determination of whether to leave the cluster of UEs. The second safety message is associated with the first safety message type and includes a clustering control field that includes the leader UE identifier and an indicator indicating an intention to leave the cluster of UEs associated with second UE. In another instance, the apparatus includes means for determining, based on the determined mode of the apparatus, to serve as a leader UE of a cluster of UEs that includes the apparatus and the second UE. The received safety message is the first safety message type. In this instance, the apparatus includes means for determining at least one of cluster location information, cluster motion information, a cluster shape, a cluster size, or a cluster population based on the received safety message. In this instance, the apparatus includes means for transmitting a second safety message based on the determined at least one of the cluster location information, the cluster motion information, the cluster shape, the cluster size, or the cluster population. The second safety message is the second safety message type. In another instance, the apparatus includes means for determining whether to leave a cluster of UEs based on the determined mode of the apparatus and on whether the apparatus has received a second safety message of the second safety message type from a leader UE associated with the cluster of UEs within a duration of time. In yet another instance, the apparatus includes means for periodically broadcasting a second safety message. The second safety message is the first safety message type, and the second safety message includes location information and motion information associated with the apparatus.

In another aspect, the computer-readable medium associated with a first user equipment (UE) stores computer executable code for wireless communication. The computer-readable medium includes code for receiving a safety message from a second UE, in which the received safety message includes a cluster indicator that indicates whether the received safety message is a first safety message type or a second safety message type, and the first safety message type is associated with a single UE and the second safety message type is associated with multiple UEs. The computer-readable medium includes code for determining whether the received safety message is the first safety message type or the second safety message type based on the cluster indicator included in the safety message. The computer-readable medium includes code for determining whether a proximity condition between the first UE and the second UE is satisfied based on the received safety message. In one instance, the first safety message type includes location information and motion information for the single UE. The second safety message type includes at least one of a cluster shape field, a cluster size field, or a cluster population field. The cluster shape field, the cluster size field, and the cluster population field of the second safety message type are associated with multiple UEs. In another instance, the first safety message type includes a clustering control field that includes a leader UE identifier associated with a leader UE of a cluster of UEs and an indicator indicating an intention to join or to leave the cluster of UEs. In another instance, the second safety message type includes a leader UE identifier associated with a leader of a cluster of UEs, cluster location information, or cluster motion information. In another instance, the second safety message type includes a special group indicator field that indicates whether the received safety message is associated with a group of senior citizens, a group of children, a group of users with disabilities, or a group of emergency personnel. In another instance, the code for determining whether the proximity condition between the first UE and the second UE is satisfied includes code for determining whether a distance between the first UE and the second UE is less than a threshold and for determining a relative motion between the first UE and the second UE. In another instance, the computer-readable medium may include code for determining a mode of the first UE, in which the mode is a standalone mode or a cluster member mode. In another instance, the computer-readable medium includes code for determining to join a cluster of UEs associated with the second UE based on the determined mode of the first UE and the determination of whether the proximity condition is satisfied. The received safety message is the second safety message type and the second UE is a leader UE of the cluster of UEs. In this instance, the computer-readable medium includes code for transmitting a second safety message based on the determination to join the cluster of UEs. The second safety message is the first safety message type and includes a clustering control field that includes an identifier associated with the second UE and an indicator indicating an intention to join the cluster of UEs associated with the second UE. In another instance, the computer-readable medium includes code for determining, based on the determined mode of the first UE, whether an identifier in the received safety message matches a leader UE identifier associated with a cluster of UEs. The first UE is a member of the cluster of UEs and the received safety message is the second safety message type. In this instance, the computer-readable medium may include code for storing information related to determining whether the proximity condition is satisfied based on the determination of whether the identifier matches the leader UE identifier. In this instance, the computer-readable medium may include code for determining whether to leave the cluster of UEs based on the determination of whether the proximity condition is satisfied and based on the determination of whether the identifier matches the leader UE identifier. In another instance, the computer-readable medium may include code for transmitting a second safety message based on the determination of whether to leave the cluster of UEs. The second safety message is associated with the first safety message type and includes a clustering control field that includes the leader UE identifier and an indicator indicating an intention to leave the cluster of UEs associated with second UE. In another instance, the computer-readable medium includes code for determining, based on the determined mode of the first UE, to serve as a leader UE of a cluster of UEs that includes the first UE and the second UE. The received safety message is the first safety message type. In this instance, the computer-readable medium includes code for determining at least one of cluster location information, cluster motion information, a cluster shape, a cluster size, or a cluster population based on the received safety message. In this instance, the computer-readable medium includes code for transmitting a second safety message based on the determined at least one of the cluster location information, the cluster motion information, the cluster shape, the cluster size, or the cluster population. The second safety message is the second safety message type. In another instance, the computer-readable medium includes code for determining whether to leave a cluster of UEs based on the determined mode of the first UE and on whether the first UE has received a second safety message of the second safety message type from a leader UE associated with the cluster of UEs within a duration of time. In another instance, the computer-readable includes code for periodically broadcasting a second safety message. The second safety message is the first safety message type, and the second safety message includes location information and motion information associated with the first UE.

In another aspect of the disclosure, a method, a computer-readable medium, and an apparatus are provided. The apparatus may be a UE. In one aspect, the apparatus determines at least one of cluster location information, cluster motion information, a cluster shape, a cluster size, or a cluster population associated with the cluster of UEs. The apparatus broadcasts a safety message that includes the at least one of the cluster location information, the cluster motion information, the cluster shape, the cluster size, or the cluster population.

In one aspect, the apparatus includes means for determining at least one of cluster location information, cluster motion information, a cluster shape, a cluster size, or a cluster population associated with the cluster of UEs. The apparatus includes means for broadcasting a safety message that includes the at least one of the cluster location information, the cluster motion information, the cluster shape, the cluster size, or the cluster population. In one instance, the apparatus includes means for receiving a second safety message from another UE. In this instance, the apparatus includes means for determining whether the second safety message is a first safety message type or a second safety message type based on a cluster indicator included in the safety message. In another instance, the apparatus includes means for determining, based on the determination that the second safety message is the first safety message type, whether the second safety message is intended for the apparatus based on whether the second safety message includes a clustering control field that includes an identifier associated with the apparatus. The second safety message includes an indicator indicating an intention to join or to leave the cluster of UEs. In another instance, the apparatus includes means for updating, based on the determination that the second safety message is intended for the apparatus, at least one of the cluster location information, the cluster motion information, the cluster shape, the cluster size, or the cluster population based on UE location information and UE motion information included in the second safety message. In another instance, the broadcasted safety message includes a special group indicator field that indicates whether the broadcasted safety message is associated with a group of senior citizens, a group of children, a group of users with disabilities, or a group of emergency personnel.

In another aspect, the computer-readable medium is associated with a leader UE that is associated with a cluster of UEs. The computer-readable medium stores computer executable code for wireless communication. The computer-readable medium includes code for determining at least one of cluster location information, cluster motion information, a cluster shape, a cluster size, or a cluster population associated with the cluster of UEs. The computer-readable medium includes code for broadcasting a safety message that includes the at least one of the cluster location information, the cluster motion information, the cluster shape, the cluster size, or the cluster population. In one instance, the computer-readable medium includes code for receiving a second safety message from another UE. In this instance, the computer-readable medium includes code for determining whether the second safety message is a first safety message type or a second safety message type based on a cluster indicator included in the safety message. In another instance, the computer-readable medium includes code for determining, based on the determination that the second safety message is the first safety message type, whether the second safety message is intended for the leader UE based on whether the second safety message includes a clustering control field that includes an identifier associated with the leader UE. The second safety message includes an indicator indicating an intention to join or to leave the cluster of UEs. In another instance, the computer-readable medium includes code for updating, based on the determination that the second safety message is intended for the leader UE, at least one of the cluster location information, the cluster motion information, the cluster shape, the cluster size, or the cluster population based on UE location information and UE motion information included in the second safety message. In another aspect, the broadcasted safety message includes a special group indicator field that indicates whether the broadcasted safety message is associated with a group of senior citizens, a group of children, a group of users with disabilities, or a group of emergency personnel.

DETAILED DESCRIPTION

Figure 1:
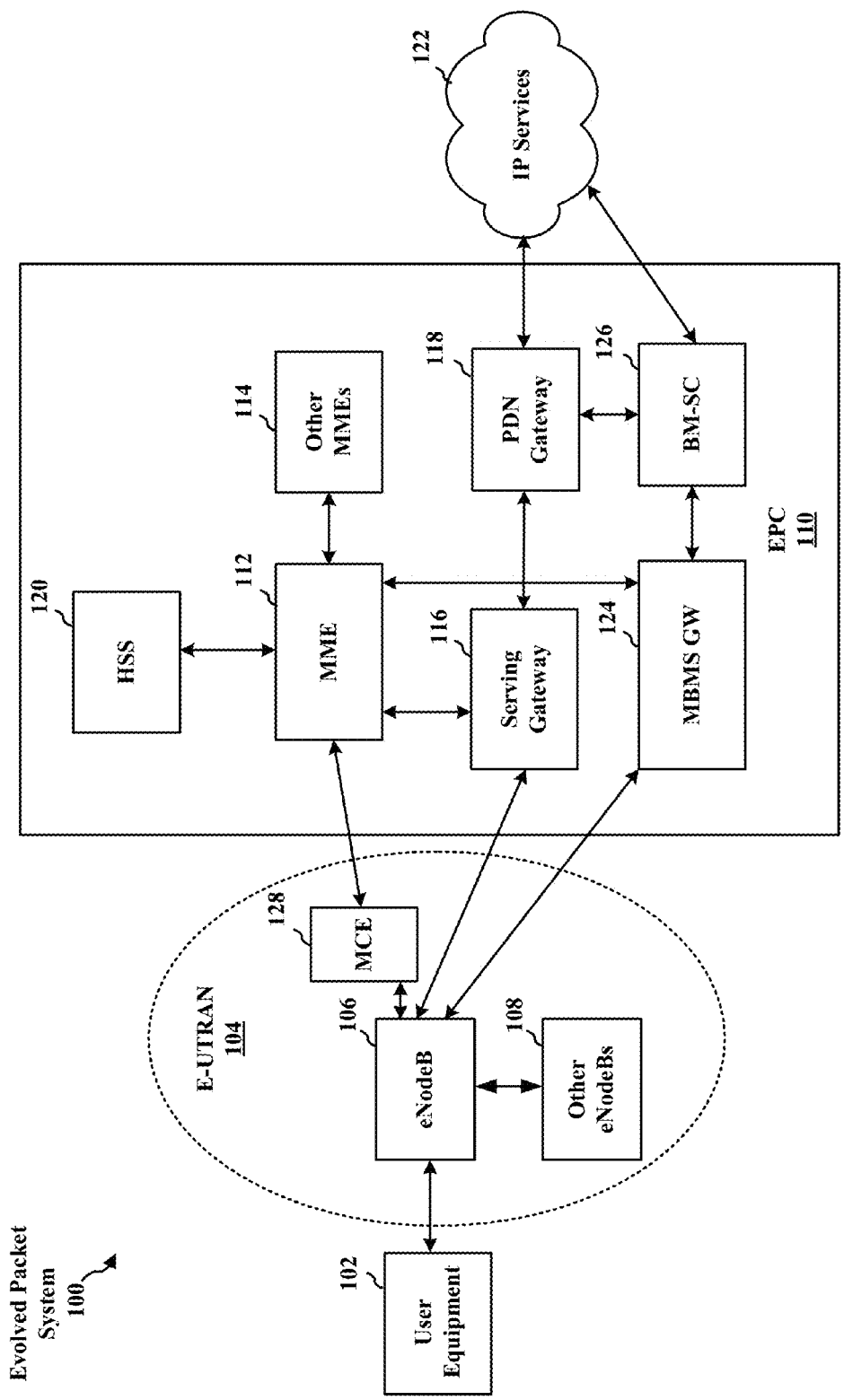
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
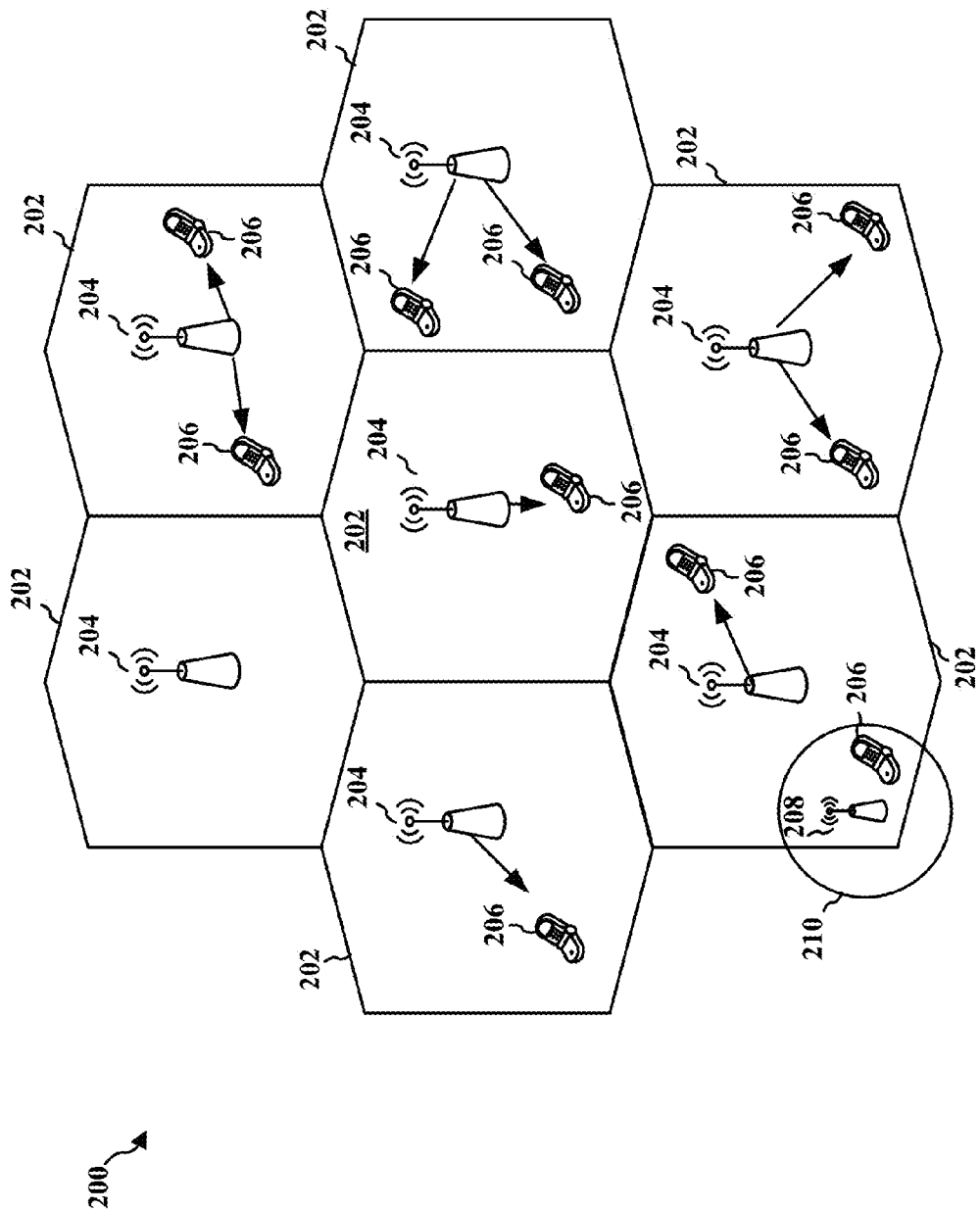
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
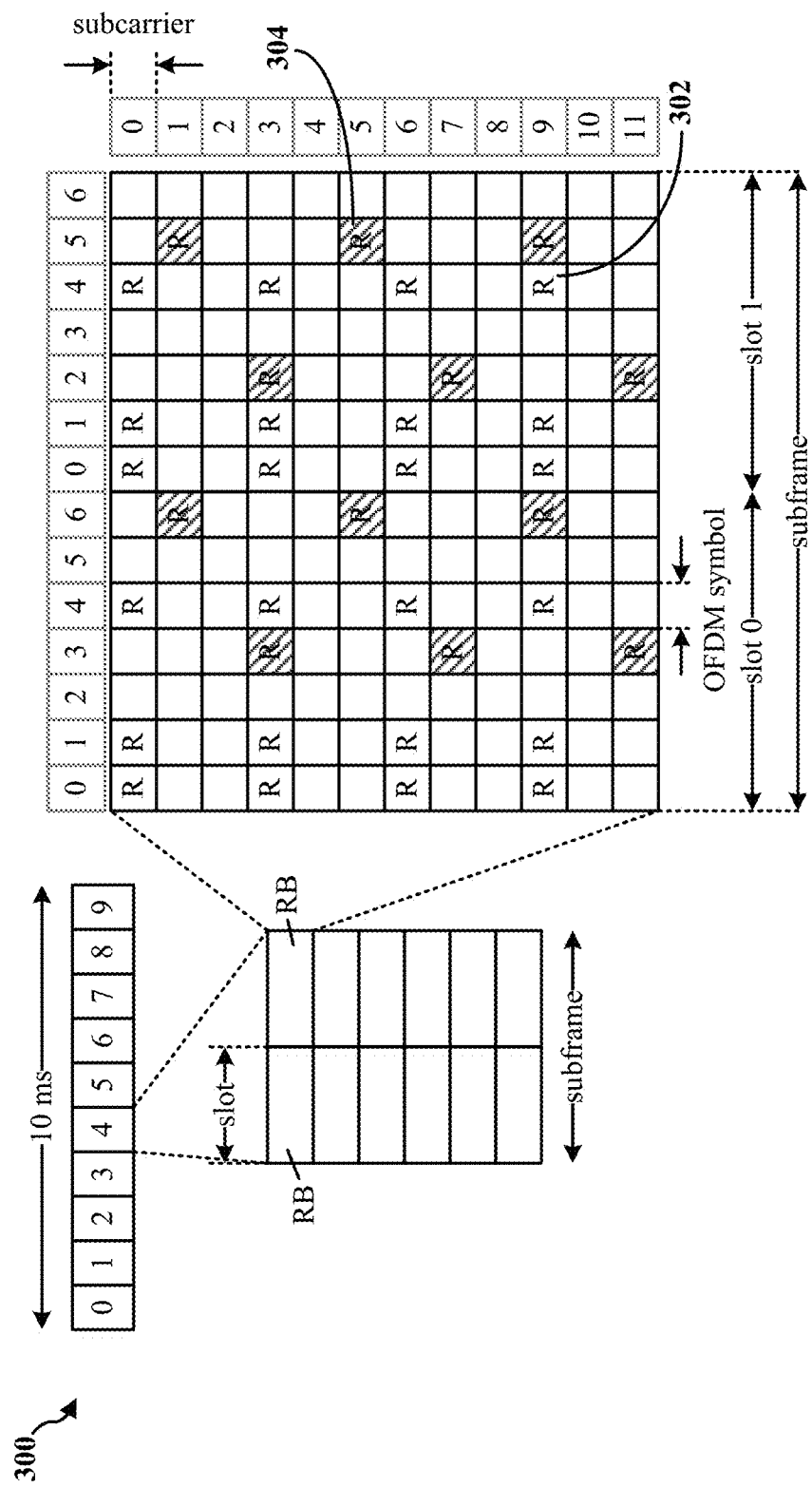
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
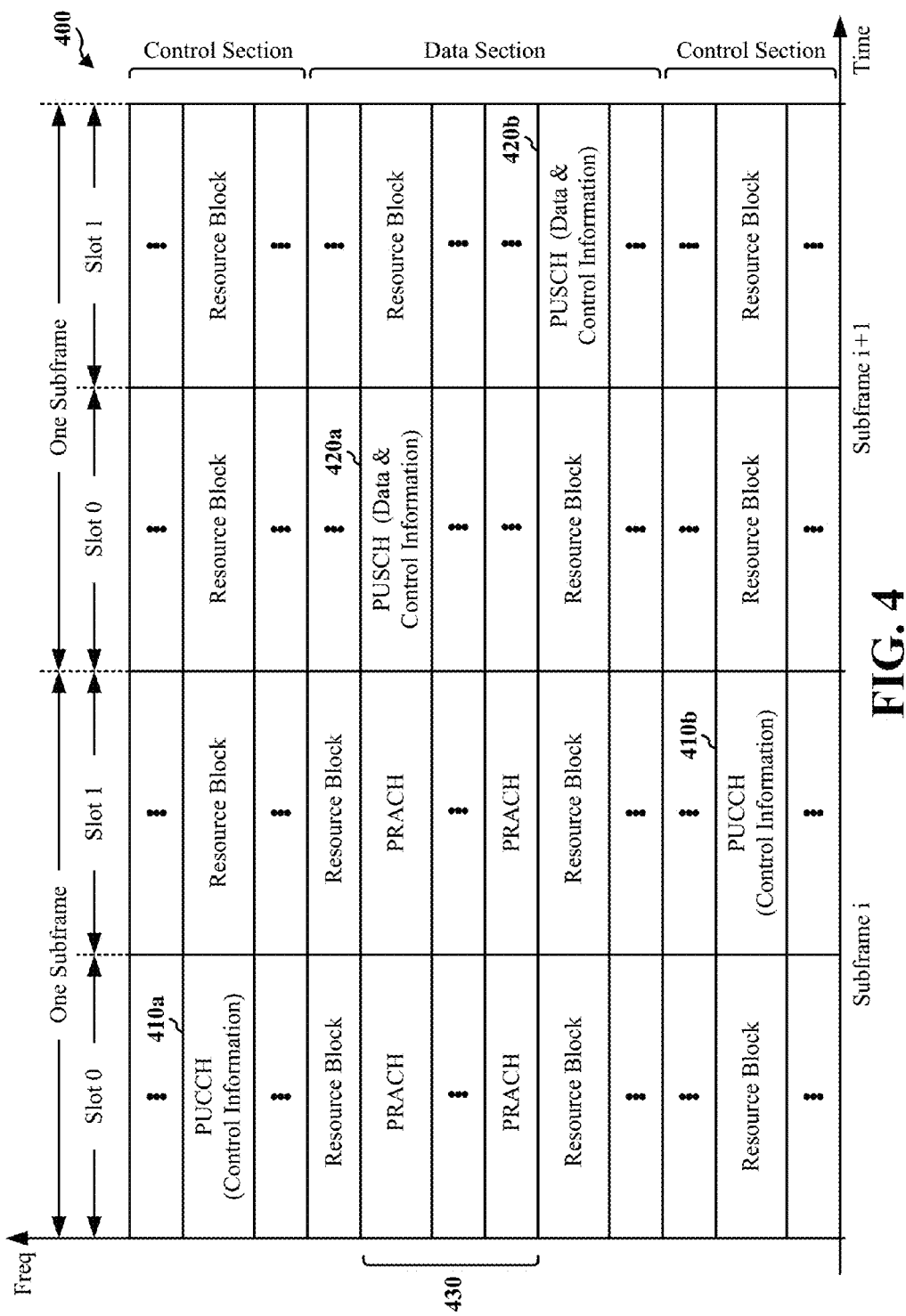
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
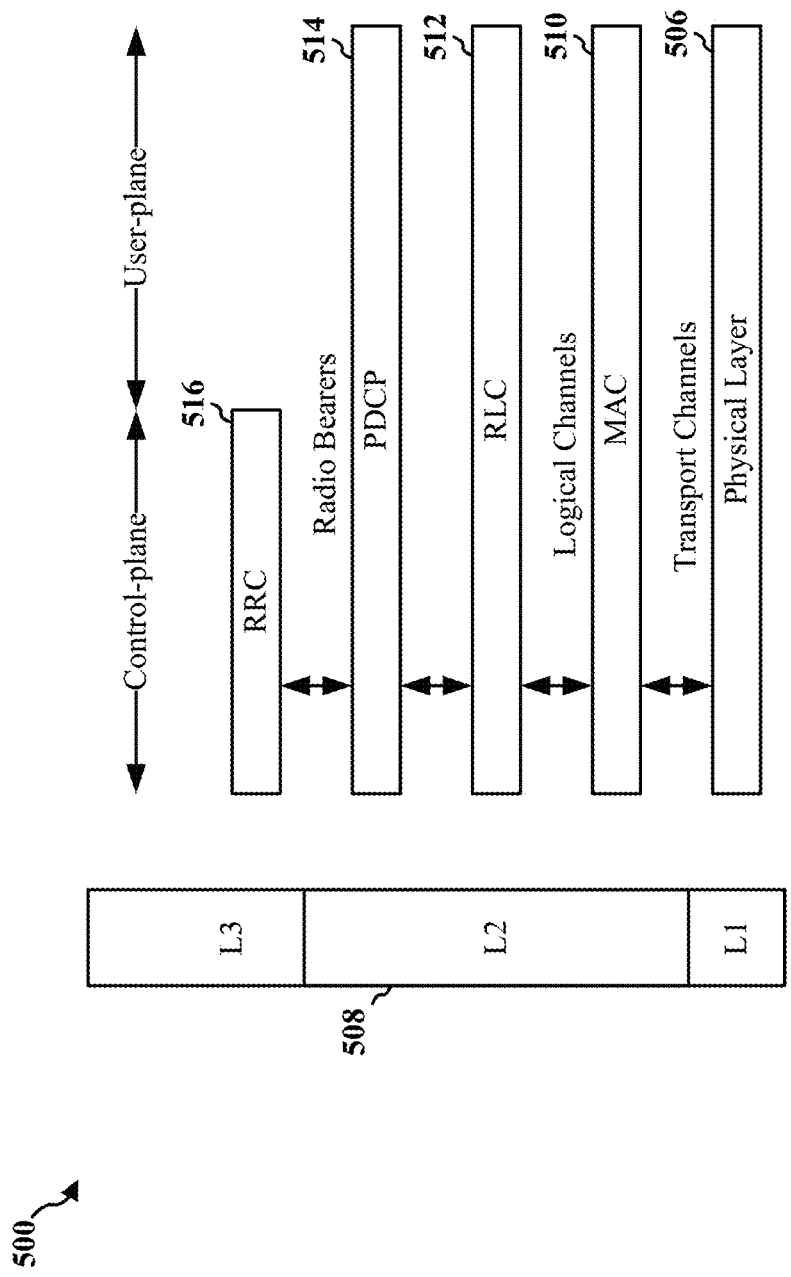
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
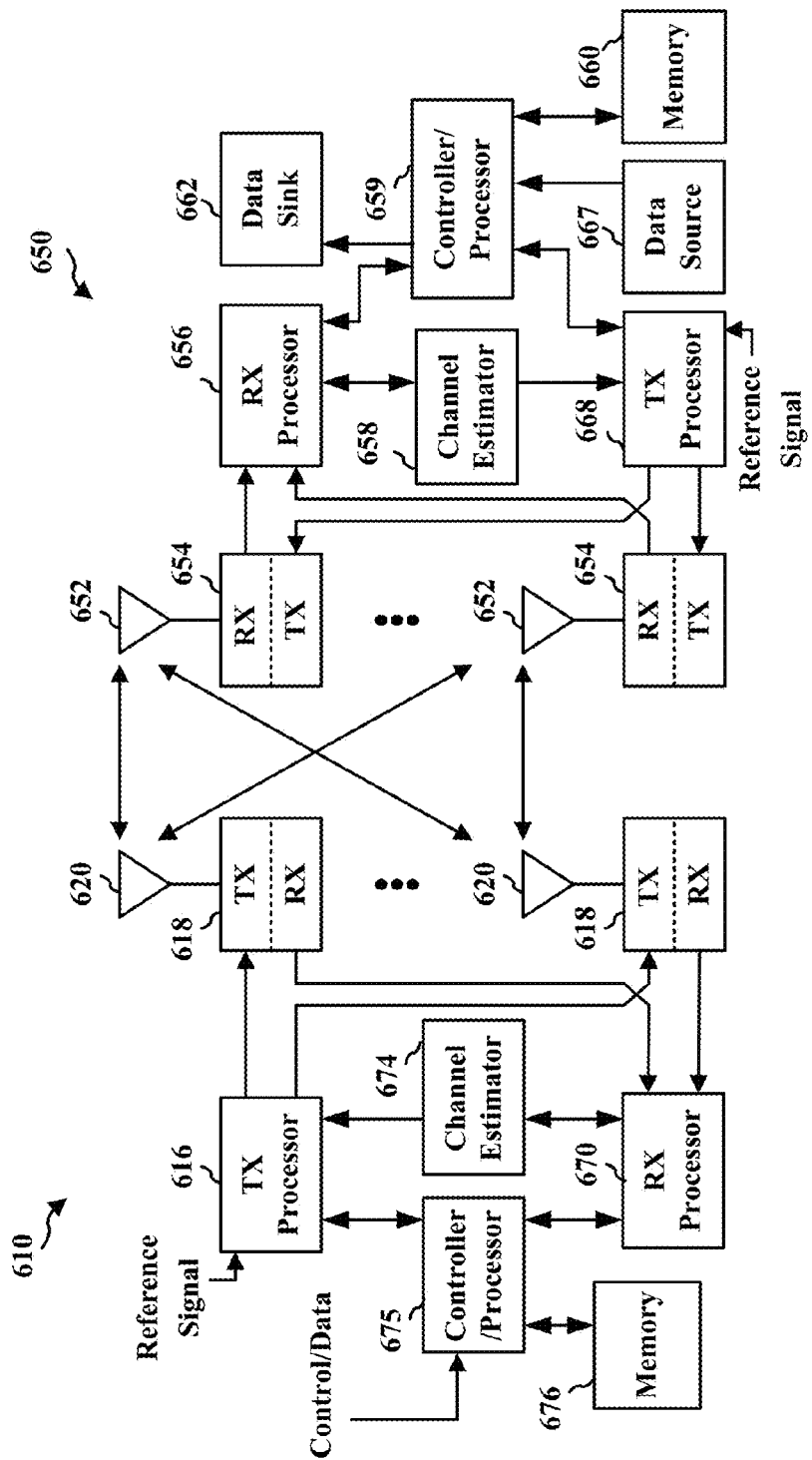
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
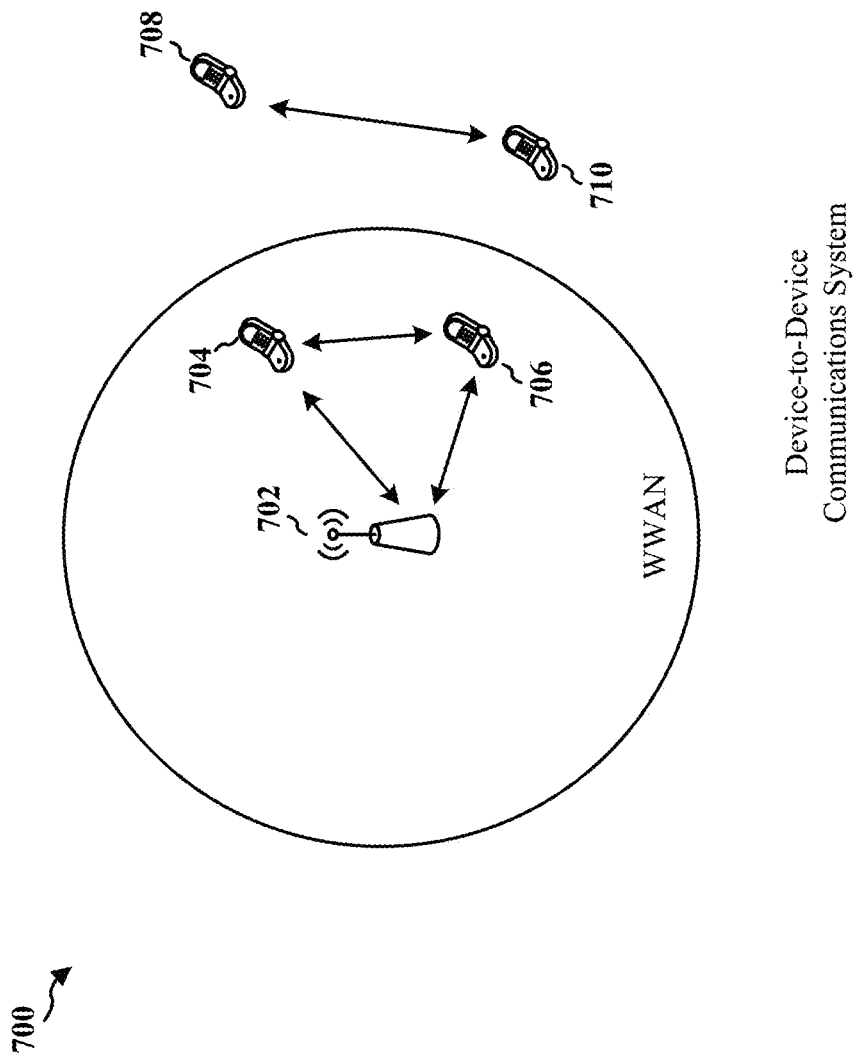
FIG. 7 is a diagram of a device-to-device (D2D) communications system.

FIG. 7 is a diagram of a device-to-device (D2D) communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A DSRC system (e.g., in a IEEE 802.11p network) may have a basic safety message (BSM) format in which a first wireless device (e.g., a vehicle or a UE) may periodically announce information related to the first wireless device, such as position, velocity, and other attributes, to other wireless devices to allow any neighboring wireless devices to track the position of the first wireless device in order to avoid collisions, improve traffic flow, etc. Safety messages may include information that enable another device to make algorithmic decisions related to safety (e.g., road safety or safety in other contexts). In an aspect, the information announced by the first wireless device may include information from other wireless devices as well, not just the device making the announcement (e.g., the first wireless device may be part of a cluster of wireless devices and transmit information on behalf of the cluster of wireless devices). By enabling DSRC in mobile devices, such as smart phones and wearables, pedestrians may send and/or receive safety messages utilizing the spectrum provided in IEEE 802.11p, for example, and indicate the presence of the pedestrians to others (e.g., to oncoming vehicles). A new vehicle-to-pedestrian (V2P) cooperative safety system applies DSRC wireless technology for accident avoidance, which may be effective during large public venues, especially in non-line-of-sight situations where a driver's view is blocked while pedestrians are walking out of somewhere behind obstacles/objects. In such situations, a camera system is unlikely to be effective.

In many scenarios, such as a busy street crossing, the density of pedestrians can be high. If each pedestrian transmitted a safety message (e.g., a BSM), a vehicle may receive a large number of similar messages, which may be distracting for a vehicular user. The large number of messages may also congest the wireless channel(s). In addition, repeated transmissions may be a significant burden on the battery of the pedestrian UEs. As such, a need exists to reduce the number of unnecessary transmission by large groups of pedestrians. Moreover, it is also important for vehicles or other devices to be aware of more information about an oncoming pedestrian group. Instead of a vehicle identifying one oncoming pedestrian nearby (e.g., a leader who transmits on behalf of an entire group), additional information about the group of pedestrians is helpful. The following discussion describes a cluster of UEs (or a group of UEs), in which information including the cluster size, cluster shape, moving trend, and/or other special properties associated with the cluster may be transmitted or broadcasted to nearby devices (e.g., vehicles) through cluster safety messages. Vehicles, for example, may use the information to visualize the cluster attributes (e.g., showing a large moving circle, or an orderly line). Vehicles may also use the information to improve algorithms for accident avoidance and pedestrian awareness. For example, a vehicle may make more conservative projections of the potential for future collisions if the cluster size is big (e.g., a large number of UEs associated with the cluster). A big cluster population may increase the level of caution. The cluster shape may also matter for designing an efficient collision-avoidance algorithm. For example, when pedestrians in a cluster are walking in a line, the collision detection calculation for the cluster may be different than if the cluster were the shape of a rectangle or a circle. Special information about the cluster may also be provided, such as whether the cluster includes mainly children or seniors, and the safety algorithm may again use more conservative collision avoidance algorithms when the cluster mainly includes children and/or seniors.

In other words, a cluster of UEs not only may need to choose a leader to exchange safety messages with vehicles or other devices, but also, the cluster of UEs will benefit from a cluster management mechanism that indicates information that can be sent to vehicles or other devices.

Although the DSRC system may be used in a V2P context, other contexts are applicable as well (e.g., pedestrians, bicycles, motorcycles, wheelchairs, vehicles, and a mixture of the same).

Figure 8A:
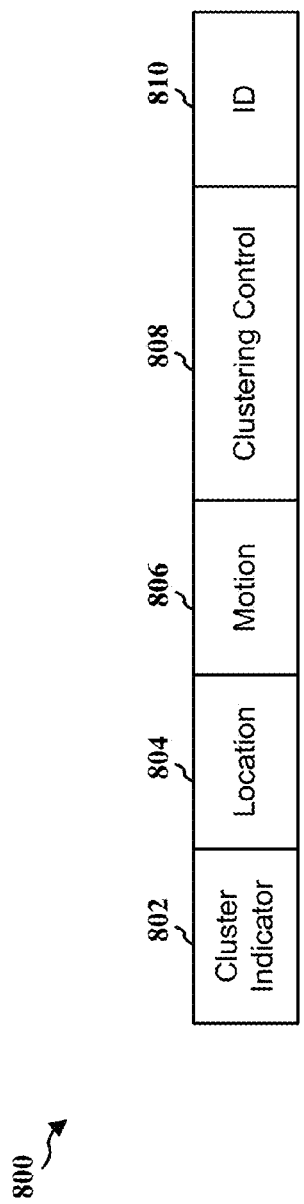
FIG. 8A illustrates a first safety message type (e.g., a basic safety message).

FIG. 8A illustrates a first safety message type 800 (e.g., a basic safety message). In an aspect, the first safety message type 800 may be associated with a single/individual UE. The first safety message type 800 may include one or more of a cluster indicator field 802, a location field 804, a motion field 806, a clustering control field 808, and an identifier (ID) field 810. The first safety message type 800 may also include other fields not pictured (e.g., altitude, acceleration information). The cluster indicator field 802 may indicate a type of safety message. In one configuration, the cluster indicator field 802 may be a bit indicator. In this configuration, if the cluster indicator field 802 is set to 0, then a safety message may be the first safety message type 800, but if the cluster indicator field 802 is set to 1, then the safety message may be a second safety message type 850. In an aspect, the first safety message type 800 may contain information about a single UE, whereas the second safety message type 850 may contain information about a cluster (or group) of UEs. The location field 804 may indicate a location/position of a UE (e.g., latitude and longitude, GPS coordinates, etc.). The motion field 806 may include velocity information about the UE such as speed and heading information. The clustering control field 808 may be used to indicate whether a UE intends to join or leave a cluster of UEs. The clustering control field 808 may include a leader UE identifier associated with a leader UE of a cluster of UEs. In an aspect, the leader UE identifier may identify a cluster of UEs. The ID field 810 may include an indicator that identifies the transmitter of the message (e.g., a MAC address).

Figure 8B:
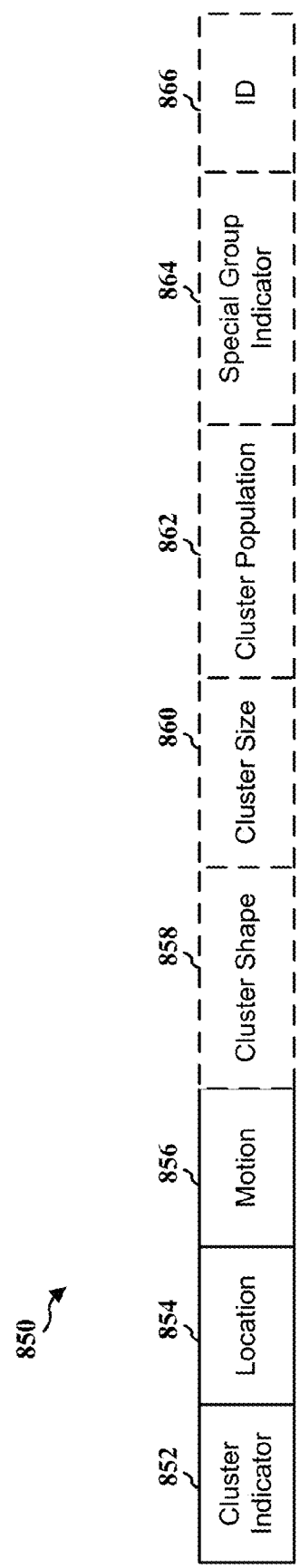
FIG. 8B illustrates a second safety message type (e.g., a cluster safety message).

FIG. 8B illustrates a second safety message type 850 (e.g., a cluster safety message). In an aspect, the second safety message type 850 may be associated with a cluster of UEs. The second safety message type 850 may include a cluster indicator field 852, a location field 854, and a motion field 856. The second safety message type 850 may also include one or more of a cluster shape field 858, a cluster size field 860, a cluster population field 862, a special group indicator field 864, and/or an ID field 866. The second safety message type 850 may include other fields not pictured (e.g., altitude, acceleration information). The cluster indicator field 852 may indicate a type of safety message (e.g., like the cluster indicator field 802). In one configuration, the cluster indicator field 852 may be a bit indicator. In this configuration, if the cluster indicator field 852 is set to 0, then a safety message may be the first safety message type 800, but if the cluster indicator field 852 is set to 1, then the safety message may be the second safety message type 850. In an aspect, the second safety message type 850 may contain information about a cluster (or group) of UEs. The location field 854 may indicate a location/position of a cluster of UEs (e.g., latitude and longitude). In one aspect, the location of the cluster of UEs may be the location of the leader UE. In another aspect, if the location of the cluster of UEs and the location of the leader UE are different, the second safety message type 850 may include location information associated with the cluster and location information associated with the leader UE of the cluster. In another aspect, the location of the cluster of UEs may be a reference point associated with a shape of the cluster of UEs. For example, if the cluster of UEs has the shape of a line, the reference point may be an approximate midpoint of the line. In another example, if the cluster of UEs has the shape of a circle, the reference point may be an approximate center of the circle. The motion field 856 may include velocity information about the cluster of UEs such as speed and heading information. In an aspect, the speed and heading information may be with respect to the reference point of the cluster of UEs. The cluster shape field 858 may indicate a shape of the cluster of UEs. In an aspect, the cluster shape field 858 may indicate that the cluster of UEs has the shape of a line, a circle, a rectangle, a triangle, or any other shape (a cluster of UEs need not form an exact shape for a shape to be determined—the closet shape may be selected). The shapes may be represented by bit indicators (e.g., a 2-bit indicator may be used to represent 4 different shapes). In an aspect, the leader UE may determine the shape of the UE based on location information collected from cluster member UEs. The cluster size field 860 may indicate the size of the cluster of UEs, which may be dependent on the cluster shape. For example, if the cluster is circularly shaped, the cluster size may indicate a radius of the circle. In another example, if the cluster is a circularly shaped, the cluster size may indicate the maximum distance among all the cluster members to a cluster reference point, which may be the leader UE's location or a computed cluster centroid. If the cluster is shaped like a rectangle, then the cluster size may indicate a length and width of the rectangle. The cluster population field 862 may indicate the number of cluster members associated with a cluster of UEs. The special group indicator field 864 may indicate special attributes of the cluster of UEs. In an aspect, the special group indicator field 864 may indicate that the cluster is a pedestrian cluster, a police vehicle cluster, a fire fighting vehicle cluster, or another emergency vehicle cluster. The special group indicator field 864 may indicate that the cluster includes mostly seniors, children, and/or people with disabilities. The ID field 866 may include an indicator that identifies the transmitter of the message (e.g., a leader UE identifier such as a MAC address).

Figure 9:
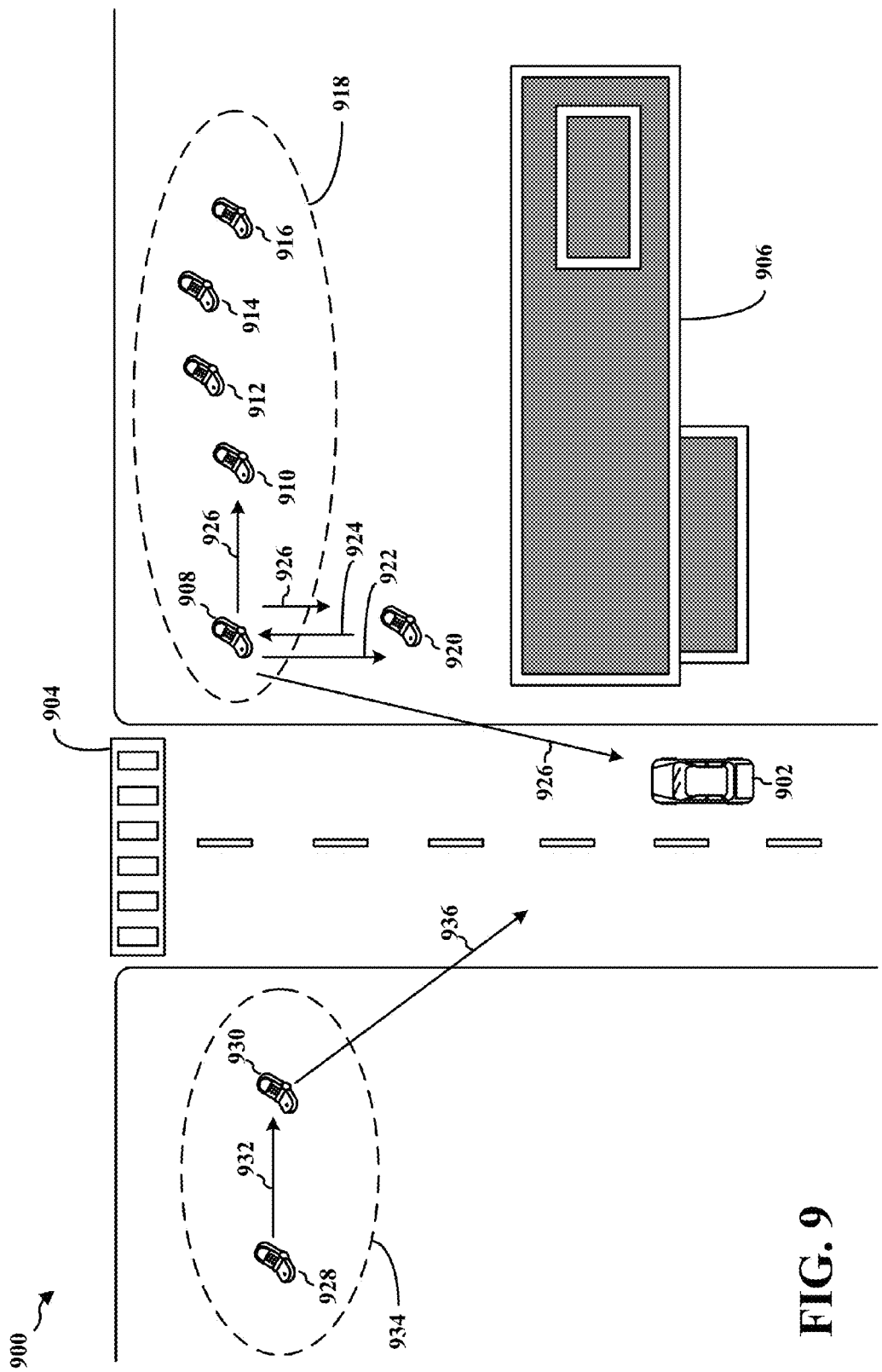
FIG. 9 is a diagram of a communications system that is configured to support wireless communications.

FIG. 9 is a diagram of a communications system 900 that is configured to support wireless communications. In an aspect, the communications system 900 may support IEEE 802.11p based communications. Referring to FIG. 9, a device 902 (e.g., a vehicle) may be approaching a crosswalk 904 at an intersection. The device 902 may be adjacent to an object 906 (e.g., a building) that partially or entirely obstructs the view of the device 902 such that the device 902 does not see users operating one or more UEs 908, 910, 912, 914, 916 and approaching the crosswalk 904. In an aspect, the UEs 908, 910, 912, 914, 916 may form a first cluster of UEs 918. In this aspect, the UE 908 of the first cluster of UEs 918 may be selected as a leader UE of the first cluster of UEs 918. The leader UE may be chosen based on factors such as, but not limited to, a remaining battery level, a time of admission into the cluster of UEs, and/or one or more UE transmission capabilities. The UE 908 may communicate on behalf of the first cluster of UEs 918 with devices (e.g., the device 902) outside of the first cluster of UEs 918.

Because the UE 908 is the leader UE, the UE 908 may determine cluster information about the first cluster of UEs 918. The cluster information may include cluster location information and/or cluster motion information associated with the first cluster of UEs 918. In one aspect, the cluster location information may indicate the location of the first cluster of UEs 918. The location may be based on the location of the UE 908 (e.g., the leader UE) or based on a reference point associated with the first cluster of UEs 918. For example, the reference point may be a function of the locations of all the UEs in the cluster. In another aspect, UE 908 may determine cluster motion information associated with the first cluster of UEs 918. Cluster motion information may include the speed and/or heading (e.g., direction) of the first cluster of UEs 918. In an aspect, the speed and/or heading may be based on the speed and/or heading of the leader UE or of a reference point associated with the first cluster of UEs 918. Based on the determined cluster location information and/or cluster motion information, the UE 908 may broadcast a first safety message 922. The first safety message 922 may be of the second safety message type (e.g., the second safety message type 850).

In an aspect, a UE 920 may be approaching the first cluster of UEs 918. The UE 920 may receive the first safety message 922 broadcasted by the UE 908. The first safety message 922 may include an identifier (e.g., a leader UE identifier) that identifies the UE 908. Upon receiving the first safety message 922, the UE 920 may determine whether the first safety message 922 is of a first safety message type (e.g., the first safety message type 800) or of a second safety message type (e.g., the second safety message type 850). In an aspect, the first safety message 922 may include a cluster indicator field (e.g. the cluster indicator field 852) with a value of 1, which may indicate that the first safety message 922 is of the second safety message type. The first safety message 922 may be associated with the first cluster of UEs 918. The first safety message 922 may indicate that the first cluster of UEs 918 has a cluster shape of a line, that the cluster size of the line (e.g., from the UE 908 to the UE 916) is 3 meters in length, and that the cluster population is 5. In an aspect, the first safety message 922 may include a special group indicator (e.g., the special group indicator field 864) indicating most (or all) of the members of the cluster are children.

The UE 920 may determine whether to join the first cluster of UEs 918 by determining whether a proximity condition is satisfied between the UE 920 and UE 908. To determine whether the proximity condition is satisfied, the UE 920 may determine a distance between the UE 908 and the UE 920 and determine whether the distance is less than a distance threshold D1. The UE 920 may determine a relative motion between the UE 908 and the UE 920 to determine whether the UE 908 and the UE 920 are headed towards each other. In one aspect, the UE 920 may determine the relative motion between the UE 908 and the UE 920 by determining the headings of the UE 908 (e.g., based on motion information from the first safety message 922) and the UE 920, and determine an angle between the headings of the UE 908 and the UE 920. If the angle is less than or equal to an angular threshold (e.g., 90 degrees), then the UE 908 and the UE 920 may be headed towards each other. Thus, if the UEs 908, 920 are within a distance threshold D1 and are headed towards each other, then the proximity condition is satisfied. If the proximity condition is satisfied and the UE 920 is not already part of another cluster of UEs (e.g., in a standalone mode), then the UE 920 may determine to join the first cluster of UEs 918. If the UE 920 is already part of another cluster of UEs (e.g., in a cluster member mode), then the UE 920 may not join the first cluster of UEs 918.

Referring to FIG. 9, the UE 920 may determine to join the first cluster of UEs 918 based on the UE 920 being in a standalone mode and based on the proximity condition being satisfied between the UE 908 and the UE 920. In an aspect, the UE 920 may store an identifier associated with the UE 908 as the cluster leader's identifier. To signal an intention to join the first cluster of UEs 918, the UE 920 may transmit a second safety message 924 of the first safety message type based on the determination to join the first cluster of UEs 918. The second safety message 924 may include a cluster indicator field that indicates the second safety message 924 is of the first safety message type. The second safety message 924 may include a clustering control field (e.g., the clustering control field 808) that includes the leader UE identifier identifying the UE 908. In an aspect, the identifier identifying the UE 908 may be obtained from the first safety message 922. The clustering control field may indicate that the UE 920 intends to join the first cluster of UEs 918. In an aspect, the UE 920 may transmit the second safety message 924 multiple times or for a period of time (e.g., for 0.2 to 0.3 seconds) to provide greater redundancy to enable the UE 908 to confirm the UE 920 as a new member. In another aspect, a power level used to transmit the second safety message 924 may be adjusted to a lower level (e.g., below a threshold) because only the leader UE (e.g., the UE 908) may need to receive the second safety message 924.

Upon receiving the second safety message 924 from the UE 920, the UE 908 may determine whether the second safety message 924 is of the first safety message type or the second safety message type (e.g., based on a cluster indicator). The UE 908 may determine whether a proximity condition is met between the UE 908 and the UE 920 based on the second safety message 924. To determine whether the proximity condition is satisfied, the UE 908 may determine a distance between the UE 908 and the UE 920 and determine whether the distance is less than the threshold D1. The UE 908 may determine a relative motion between the UE 908 and the UE 920 to determine whether the UE 908 and the UE 920 are headed towards each other. If the distance between the UE 908 and the UE 920 is under the threshold D1 and the UE 908 and the UE 920 are headed towards each other, then the proximity condition may be satisfied. If the second safety message 924 is of the second safety message type (e.g., a cluster safety message), then the UE 908 may ignore the second safety message 924. If the second safety message 924 is of the first safety message type (e.g., a basic safety message), then the UE 908 may determine if the second safety message 924 is intended for the UE 908. The second safety message 924 is intended for the UE 908 if the second safety message 924 contains a clustering control field that includes a leader UE identifier associated with the UE 908. If the second safety message 924 is intended for the UE 908, then the UE 908 may determine if the clustering control field indicates an intention to join or to leave the first cluster of UEs 918. In an aspect, the UE 908 may have a list of cluster members associated with the first cluster of UEs 918. In another aspect, if the second safety message 924 indicates an intention to join the first cluster of UEs 918, then the UE 908 may add the UE 920 to the list of cluster members (e.g., add a UE identifier associated with the UE 920) if the proximity condition is satisfied. If the proximity condition is not satisfied, then UE 908 may send a message to the UE 920 indicating that the UE 920 may not join the first cluster of UEs 918. In another aspect, if the second safety message 924 indicates an intention to leave the first cluster of UEs 918, then the UE 908 may delete the UE 920 from the list of cluster members.

In this case, the UE 920 wants to join the first cluster of UEs 918. The UE 908 may then update the cluster information associated with the first cluster of UEs 918 based on the location information and motion information associated with the UE 920 and included in the second safety message 924. The cluster information may include at least one of a cluster shape, a cluster size, or a cluster population. The UE 908 may update cluster information when a UE joins and/or leaves the cluster. In an aspect, to update the cluster shape and/or cluster size, the locations of all other member UEs may need to be considered. The UE 908 may store the location and motion information associated with all members in a local table. In this case, when the UE 920 joins the first cluster of UEs 918, the UE 908 may increase the cluster population by 1, determine the cluster shape and cluster size based on the location/motion information of the UE 920 and based on the location/motion information of other UEs in the first cluster of UEs 918. In an aspect, if the reference point of the cluster is the leader UE's location, then reference point need not be updated. However, if the reference point is based on locations of other UE members, then the motions of other UEs may need to be considered when updating the location information for the cluster.

After updating the cluster information, the UE 908 may broadcast a third safety message 926 of the second safety message type. The third safety message 926 may include updated cluster information (e.g., cluster shape, size, and/or population). In an aspect, the third safety message 926 may be broadcasted to wireless devices outside of the first cluster of UEs 918 (as well as to wireless devices within the first cluster of UEs 918). The device 902 may receive the third safety message 926 and determine that the third safety message 926 is of the second safety message type. In an aspect, the third safety message 926 may indicate that the first cluster of UEs 918 is made up of mostly children and that the first cluster of UEs 918 is headed toward the crosswalk 904. To avoid colliding with the first cluster of UEs 918, the device 902 may reduce speed and/or change direction or indicate that speed and/or direction should be reduced or changed, respectively. In an aspect, the algorithm for collision avoidance may adjust (e.g., be more conservative) based on the first cluster of UEs 918 having mostly children.

In another aspect, the UE 910 may receive the third safety message 926 broadcasted by the UE 908. The UE 910 may determine whether the third safety message 926 is of the first safety message type or the second safety message type. Because the UE 910 is in a cluster member mode (e.g., part of a cluster of UEs), the UE 910 may ignore the third safety message 926 if the third safety message 926 is of the first safety message type. If the third safety message 926 is of the second safety message type, however, the UE 910 may determine whether a proximity condition between the UE 910 and the UE 908 is satisfied. The UE 910 may determine the whether the proximity condition between the UE 910 and the UE 908 is met by determining whether the distance between the UE 910 and the UE 908 is less than a distance threshold D2 and by determining the relative motion of the UE 910 and the UE 908 (e.g., whether the UE 910 and the UE 908 are approaching each other). The UE 910 may determine whether an identifier in the third safety message 926 matches or is associated with the leader UE (e.g., the UE 908) of the first cluster of UEs 918 with which the UE 910 is associated. If the identifier is not associated with the UE 908, then the UE 910 may discard the proximity condition determination information (e.g., distance between UEs 908, 910 and respective heading information). But if the identifier is associated with the UE 908, then the UE 910 may store information related to determining the proximity condition between the UE 908 and the UE 910. The information related to determining the proximity condition may include a calculated distance between the UE 908 and the UE 910 at the time the third safety message 926 is received, a determination of whether the UE 908 and the UE 910 are headed toward or away from each other (e.g., based on angle between headings). The UE 910 may determine whether to leave the first cluster of UEs 918 based on the information related to whether the proximity condition is met. For example, if the UE 910 determines that the UE 910 and the UE 908 (or the first cluster of UEs 918) are separated by a distance greater than a threshold D2 and the relative motion is away from each other (e.g., the angle between the headings of the UE 910 and the UE 908 is greater than an angular threshold A2 where A2>90 degrees), then the UE 910 may decide to leave the first cluster of UEs 918. But if the UE 910 determines that the UE 910 and the UE 908 (or the first cluster of UEs 918) are moving closer together or are within the distance threshold D2 (e.g., a minimum distance threshold of 1 meter), then the UE 910 may determine to stay with the first cluster of UEs 918. If the UE 910 determines to leave the first cluster of UEs 918, the UE 910 may send a safety message (not pictured) of the first safety message type to the UE 908, indicating, in the clustering control field, the identifier associated with the UE 908 and indicating an intention to leave the first cluster of UEs 918. In an aspect, the safety message from the UE 910 may be sent continuously for a period of time (e.g. 0.2-0.3 seconds), at which point the UE 910 may resume sending safety messages of the first safety message type in which the clustering control fields may be empty. In another aspect, the safety message indicating that the UE 910 will leave the first cluster of UEs 918 may be sent with a lower power level because only the UE 908 may need to receive the safety message.

In another aspect, if the UE 910 receives a safety message (not pictured) from another leader associated with a different UE cluster, the UE 910 may ignore the safety message. Similarly, if the UE 908 receives a safety message (not pictured) from associated with a different UE cluster, the UE 908 may ignore the safety message.

In another aspect, if the UE 910 (or another UE that is a member of the first cluster of UEs 918) has not received a safety message of the second safety message type from the UE 908 within a duration of time (e.g., 3-5 seconds), then the UE 910 may determine to leave the first cluster of UEs 918. For example, the UE 908 may be too busy to transmit safety messages, may be out of power, or may have moved too far away from the UE 910. In any of those cases, the UE 910 may choose to leave the first cluster of UEs 918.

In another aspect, the UE 910 may periodically broadcast a safety message or a cyclical probing message (not pictured) of the first safety message type that includes location and motion information of the UE 910. The period for sending the cyclical probing message may be large (e.g., in the order of minutes) in order to reduce channel congestion and power consumption. The power level used for transmitting a cyclical probing message may be adjusted to a low level because only the cluster leader may need to receive such messages. The cyclical probing message may be used to indicate to the UE 908 that the UE 910 remains active. Other UEs in the first cluster of UEs 918 may also periodically broadcast safety messages of the first safety message type. The UE 908 (or a different leader UE) may use the broadcasted safety messages to update the information for each respective member UE, and the information may be stored in a table. Based on the updated UE information, the cluster information (e.g., cluster location, cluster shape, cluster size, cluster population) may also be updated for the next safety message broadcast.

In another aspect, the UE 908 may periodically update cluster information. In one instance, the UE 908 may periodically update location and motion information associated with the UE 908, and the cluster information may be the same as the location and motion information associated with the UE 908. In another instance, the cluster information may be based on all the member UEs and the received and stored location and motion information of other member UEs may be used to update the cluster information (e.g., the reference point) associated with the first cluster of UEs 918. In an aspect, the reference point may be updated at the same frequency as the location/motion information for the UE 908 is updated.

Referring to FIG. 9, the UEs 928, 930 may be in a standalone mode. In an aspect, the UE 928 may broadcast a fourth safety message 932 of the first safety message type. The fourth safety message 932 may include an identifier associated with the UE 928 and may include location and motion information associated with the UE 928. The UE 930 may receive the fourth safety message 932 and determine that the fourth safety message 932 is associated with the UE 928 based on the identifier included in the fourth safety message 932.

Upon receiving the fourth safety message 932, the UE 930 may determine that the fourth safety message 932 is a first safety message type based on a cluster indicator (e.g., the cluster indicator field 802) being set to 0. The fourth safety message 932 may also include a clustering control field, but the clustering control field may have a null value because the fourth safety message 932 is not directed to any UE cluster. The UE 930 may determine that the fourth safety message 932 is not directed to any UE cluster based on the null values in the clustering control field. The UE 930 may determine whether a proximity condition between the UE 928 and the UE 930 is met. As with previous examples, determining whether the proximity condition is met may include determining a current distance between the UE 928 and the UE 930 and determining whether the UE 928 and the UE 930 are headed towards each other. If the current distance is less than a distance threshold and the UEs 928, 930 are headed towards each other, then the UE 930 may determine to initiate a second cluster of UEs 934. In this aspect, the UE 930 may determine to initiate the second cluster of UEs 934 based on the UE 930 being in standalone mode and based on the fourth safety message 932 received from the UE 928 (e.g., a proximity condition is met). The UE 930 may determine cluster information such as one or more of a cluster shape, a cluster size, a cluster population, a cluster location, and a cluster motion based on the fourth safety message 932. In an aspect, the UE 928 may transmit the fourth safety message 932 multiple times over a period (e.g., 0.1 seconds) and the UE 930 may utilize a data collection period (e.g., 0.2-0.3 seconds) to determine the cluster information. The UE 930 may determine the cluster shape is a line, the cluster size is 1 meter, and the cluster population is 2. The UE 930 may add the UE 928 to a list of cluster members associated with the second cluster of UEs 934. Based on the cluster information, the UE 930 may broadcast a fifth safety message 936 of the second safety message type that includes cluster information associated with the second cluster of UEs 934. The fifth safety message 936 may indicate that the UEs 928, 930 are associated with police officers and other cluster information (e.g., the location information which may be the location of the UE 930).

Figure 10:
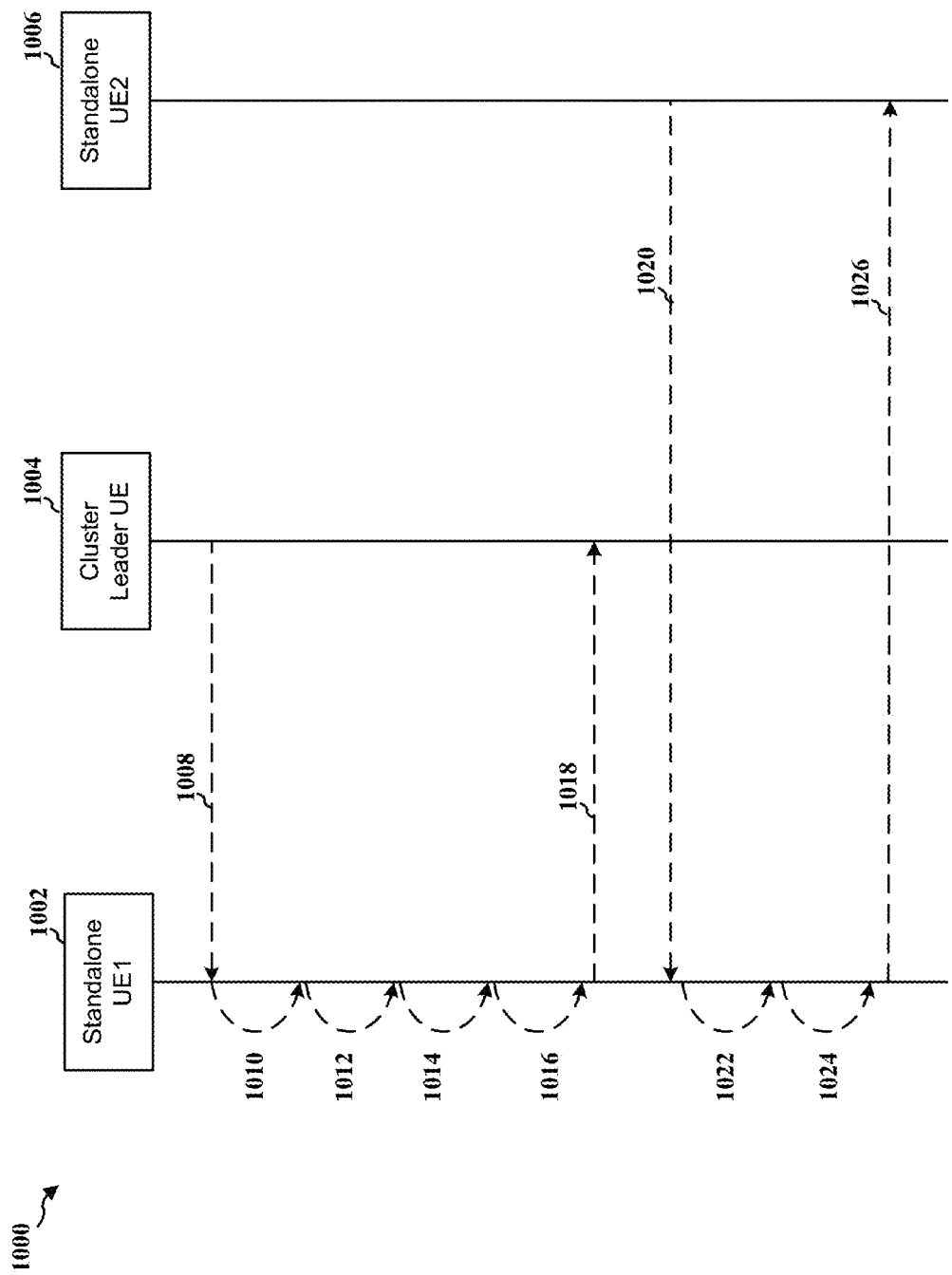
FIG. 10 depicts a call flow diagram that describes operations of a first UE operating in a wireless communication system that includes a leader UE and a second UE.

FIG. 10 depicts a call flow diagram 1000 that describes operations of a first UE 1002 operating in a wireless communication system that includes a leader UE 1004 and a second UE 1006. The first UE 1002 and the second UE 1006 may be standalone UEs (e.g., UEs not part of a cluster), and the leader UE 1004 may be the leader UE of a UE cluster. In one configuration, at 1008, the first UE 1002 may receive a first safety message from the leader UE 1004. At 1010, the first UE 1002 may determine whether the first safety message is of a first safety message type (e.g., a BSM) or of a second safety message type (e.g., a cluster safety message) based on a cluster indicator included in the first safety message. In this configuration, the first safety message is of the second safety message type. At 1012, the first UE 1002 may determine whether a proximity condition between the first UE 1002 and the leader UE 1004 is satisfied based on the first safety message. At 1014, the first UE 1002 may determine whether the first UE 1002 is in a standalone mode (e.g., not associated with any UE cluster) or a cluster member mode (e.g., associated with a UE cluster). At 1016, based on the determination that the first UE 1002 is in a standalone mode and on the determination that the proximity condition is satisfied, the first UE 1002 may determine to join a cluster of UEs associated with the leader UE 1004. At 1018, the first UE 1002 may broadcast a second safety message based on the determination to join the cluster of UEs. The second safety message may be associated with the first safety message received from the leader UE 1004 and indicate an intention to join the cluster of UEs associated with the leader UE.

In another configuration, the first UE 1002 may not have received a cluster safety message from the leader UE 1004 or may have determined not to join the UE cluster associated with the leader UE 1004 because the proximity condition is not met. In this configuration, at 1020, the first UE 1002 may receive a third safety message from the second UE 1006, which may be another standalone UE. The third safety message may be a BSM. At 1022, the first UE 1002 may determine, based on the first UE 1002 being in standalone mode, to serve as a leader UE of a cluster of UEs. In an aspect, this determination may be based a previous determination that the proximity condition between the first UE 1002 and the second UE 1006 is met. In another aspect, the first UE 1002 may be randomly chosen to be the leader UE in a cluster that includes the first UE 1002 and the second UE 1006. In another aspect, the first UE 1002 may be selected as the leader UE based on a set of criteria (e.g., UE transmission capability, battery level, etc.). Upon being selected as the leader UE, at 1024, the first UE 1002 may determine one or more of a cluster shape, cluster size, or cluster population as related to the newly formed UE cluster. At 1026, the first UE 1002 may broadcast/transmit a fourth safety message of the second safety message type based on the determined cluster information. In an aspect, the fourth safety message may indicate that the first and second UEs 1002, 1006 are firefighters.

Figure 11:
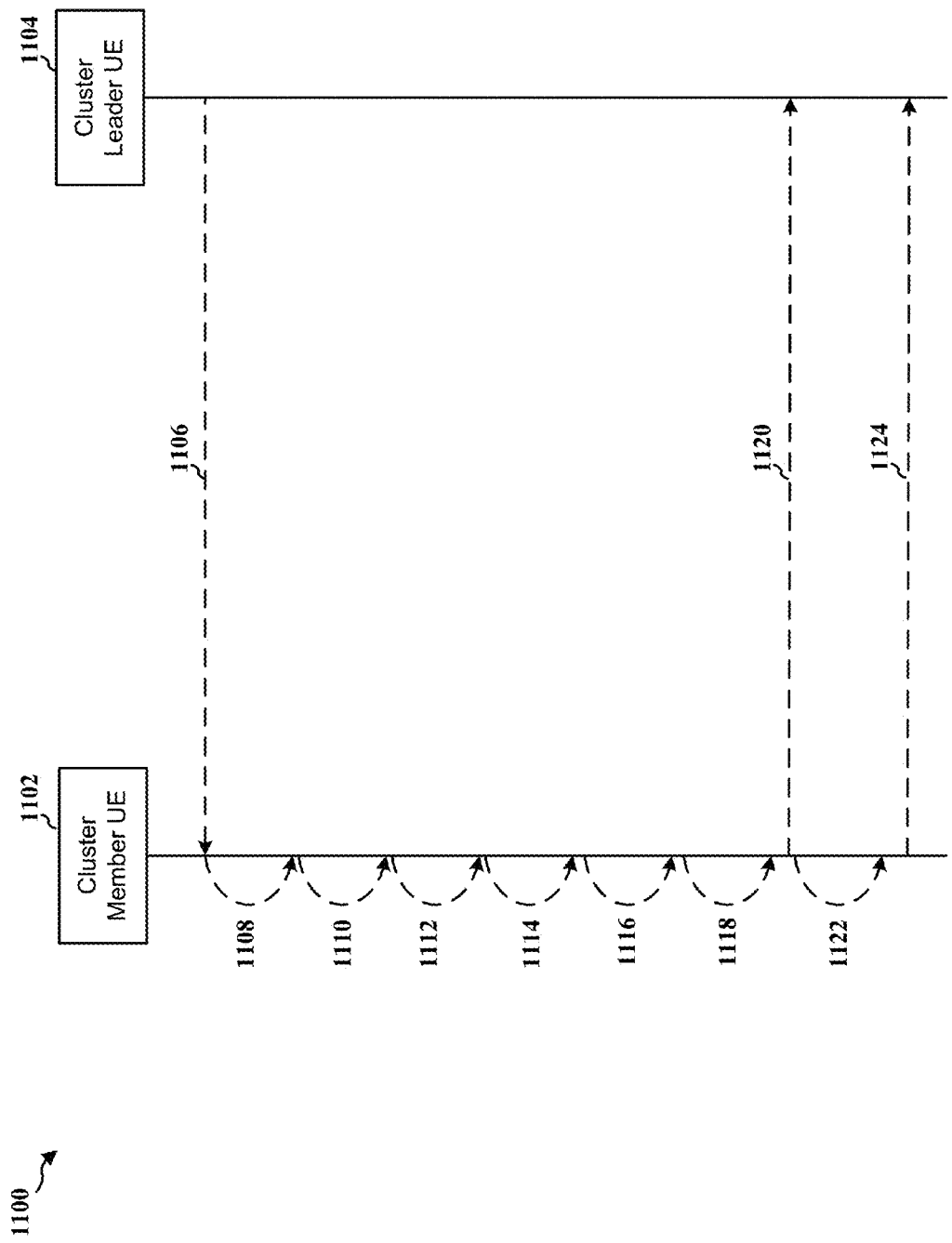
FIG. 11 depicts a call flow diagram that describes operations of a cluster member UE operating in a wireless communication system that includes a leader UE.

FIG. 11 depicts a call flow diagram 1100 that describes operations of a cluster member UE 1102 operating in a wireless communication system that includes a leader UE 1104. The cluster member UE 1102 may be a member of a UE cluster in which the leader UE 1104 is the leader. The cluster member UE 1102 may be in cluster member mode. At 1106, the cluster member UE 1102 may receive a first safety message broadcasted by the leader UE 1104. At 1108, the cluster member UE 1102 may determine whether the first safety message is of the first safety message type or the second safety message type based on a cluster indicator. In this case, the first safety message is of the second safety message type. The first safety message may include cluster information such as cluster location, cluster motion, cluster shape, cluster size, and/or cluster population. The first safety message may also include location and motion information about the leader UE 1104. At 1110, the cluster member UE 1102 may determine whether a proximity condition between the cluster member UE 1102 and the leader UE 1104 is met. At 1112, the cluster member UE 1102 may determine whether the cluster member UE 1102 is in a standalone mode or a cluster member mode. In an aspect, state information (e.g., a bit indicator) may be stored in the cluster member UE 1102 that indicates which mode the cluster member UE 1102 is in. Based on the cluster member UE 1102 being in cluster member mode, at 1114, the cluster member UE 1102 may determine whether an identifier in the first safety message (e.g., identifier in the ID field 855) matches the identifier for the leader UE 1104. If so, the cluster member UE 1102 may determine that the first safety message is associated with the same cluster of which the cluster member UE 1102 is a member. At 1116, if the first safety message is associated with the same cluster as the cluster member UE 1102, then the cluster member UE 1102 may store information related to the determination of the proximity condition between the cluster member UE 1102 and the leader UE 1104 is satisfied. At 1118, the cluster member UE 1102 may determine whether to leave the cluster based on the determination of whether the proximity condition is met. That is, if the proximity condition is not met, then the cluster member UE 1102 may determine to leave the cluster, but if the proximity condition is met, then the cluster member UE 1102 may determine to stay with the cluster. In one configuration, the proximity condition may not be met. In this configuration, a 1120, the cluster member UE 1102 may transmit (or broadcast) a second safety message of the first safety message type. The second safety message may include a cluster control field that includes an identifier associated with the leader UE 1104 and indicates an intention to leave the cluster. In another configuration, the proximity condition may be met and the cluster member UE 1102 may not leave the cluster. Subsequently, at 1122, after a duration of time has elapsed without having received another safety message associated with the cluster, the cluster member UE 1102 may determine whether to remain with the cluster. If the cluster member UE 1102 decides to leave the cluster, the cluster member UE 1102 may broadcast a safety message (not pictured) of the first type identifying the leader UE in the clustering control field and indicating an intention to leave the cluster. At 1124, if the cluster member UE 1102 decides to stay with the cluster, the cluster member UE 1102 may periodically broadcast a safety message of the first type indicating location and motion information associated with the cluster member UE 1102 to enable the leader of the cluster to update cluster information.

Figure 12:
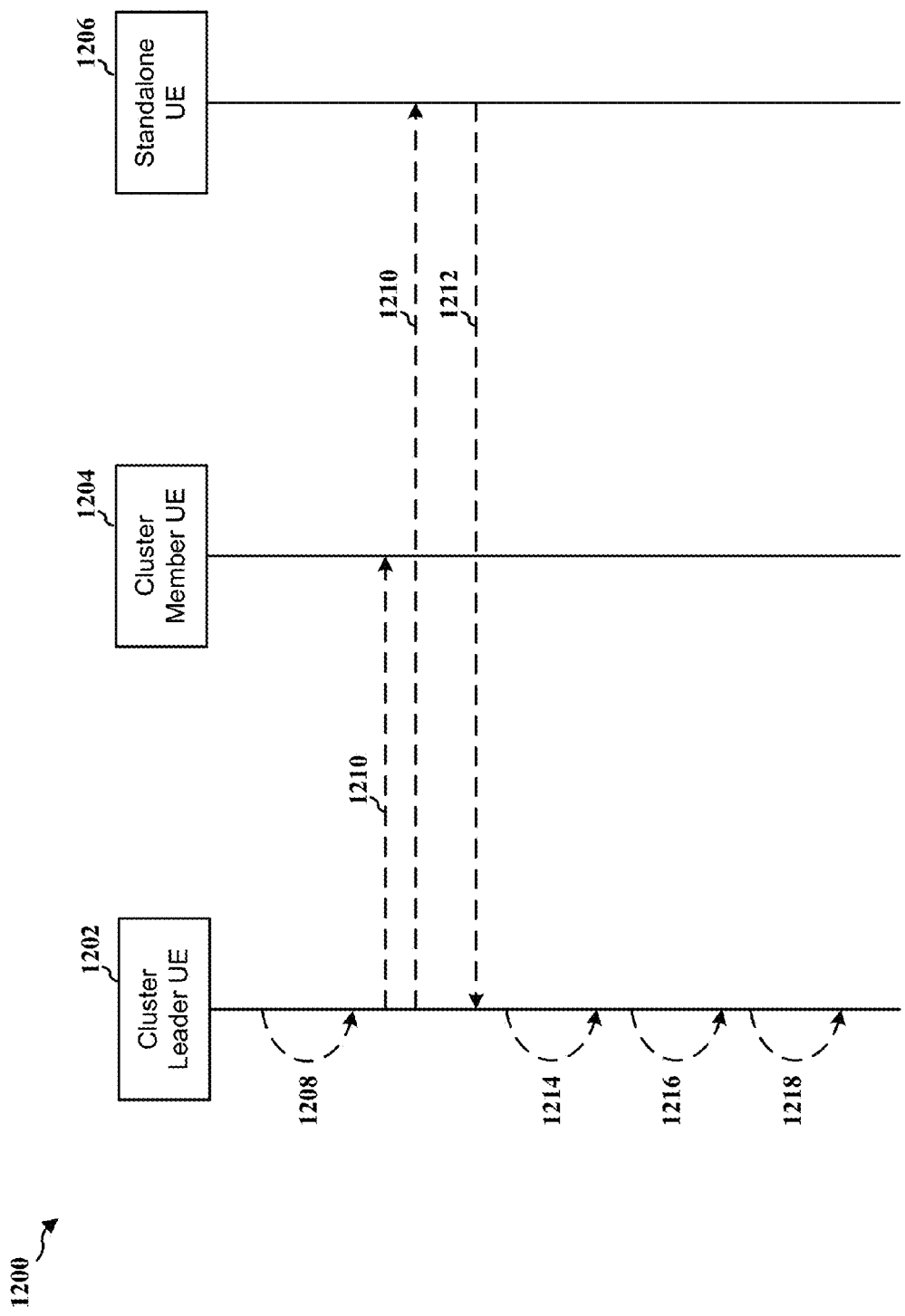
FIG. 12 depicts a call flow diagram that describes operations of a leader UE, a cluster member UE, and a standalone UE operating in a wireless communication system.

FIG. 12 depicts a call flow diagram 1200 that describes operations of a leader UE 1202, a cluster member UE 1204, and a standalone UE 1206 operating in a wireless communication system. The leader UE 1202 may be associated with the same UE cluster as the cluster member UE 1204. The standalone UE 1206 may not be associated with any UE cluster. In an aspect, at 1208, the leader UE 1202 may determine cluster information associated with the cluster. The cluster information may include cluster location information, cluster motion information, cluster shape, cluster size, and/or cluster population. At 1210, the leader UE 1202 may broadcast a first safety message of the second safety message type (e.g., a cluster safety message). The first safety message may include cluster information determined at 1208. The first safety message may be received by the cluster member UE 1204 and the standalone UE 1206. In one aspect, the standalone UE 1206 may determine to join the cluster associated with the leader UE 1202. At 1212, the standalone UE 1206 may transmit a second safety message of the first safety message type to the leader UE 1202. At 1214, leader UE 1202 may determine whether the second safety message is of the first safety message type or the second safety message type. At 1216, based on the determination that the second safety message is of the first safety message type, the leader UE 1202 may determine whether the second safety message is intended for the leader UE 1202 based on the clustering control field (e.g., is an identifier in the clustering control field associated with the leader UE 1202). If the second safety message was intended for the leader UE 1202, then at 1218, the leader UE 1202 may admit the standalone UE 1206 into the cluster and update the cluster information based on location and motion information in the second safety message.

Figure 13:
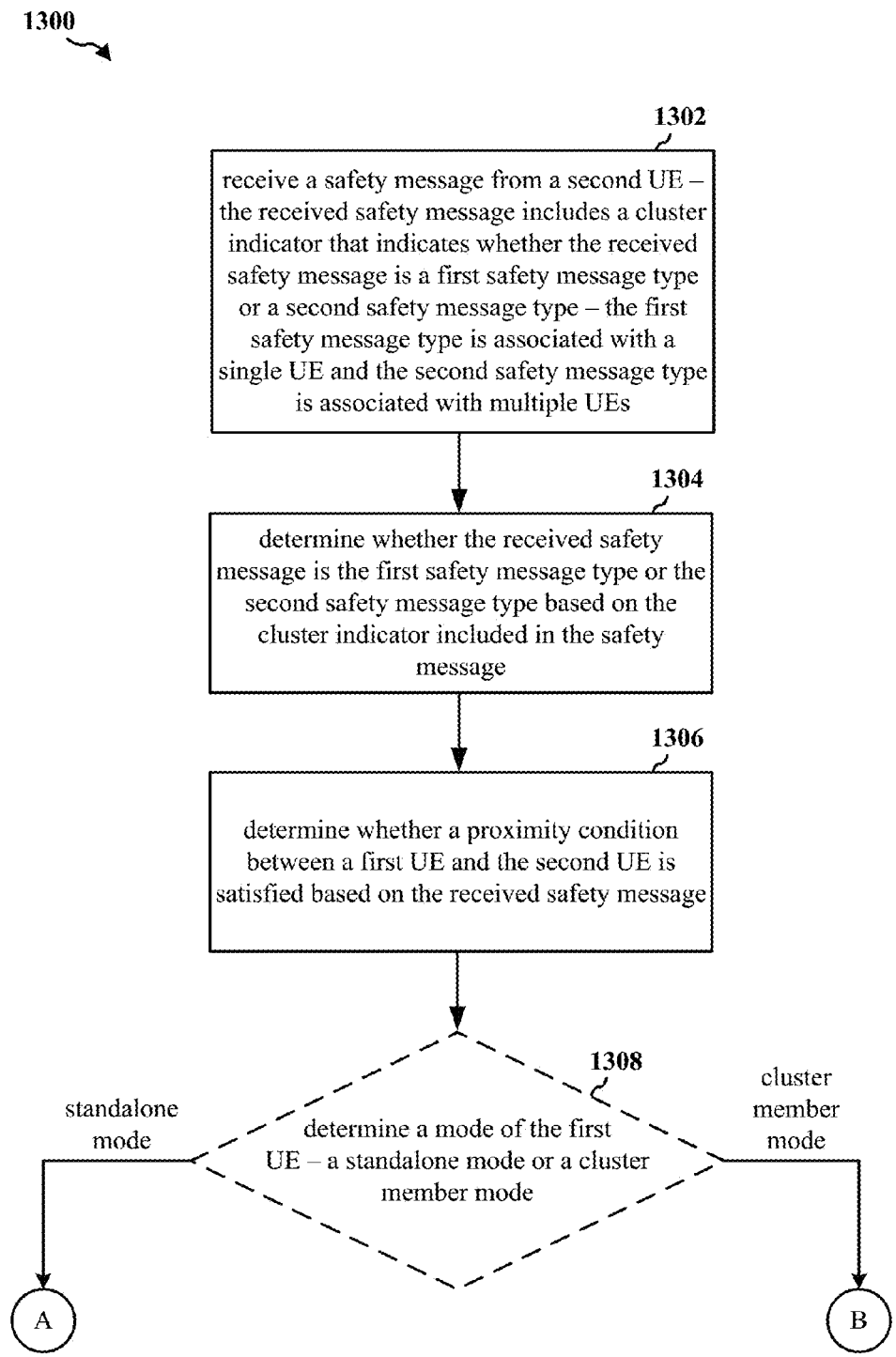
FIGS. 13-16 are flowcharts of methods of wireless communication.

FIG. 13 is a flowchart 1300 of a method of wireless communication. The method may be performed by a UE (e.g., the UE 920, the UE 930, the apparatus 1702/1702', infra). At 1302, the UE may receive a safety message from a second UE. The received safety message may include a cluster indicator that indicates whether the received safety message is a first safety message type or a second safety message type. The first safety message type may be associated with a single UE and the second safety message type may be associated with multiple UEs. In an aspect, the first safety message type may include location information and motion information for the single UE, and the second safety message type may include at least one of a cluster shape field, a cluster size field, or a cluster population field. The cluster shape field, the cluster size field, and the cluster population field of the second safety message type is associated with multiple UEs. In another aspect, the second safety message type may include a leader UE identifier associated with a leader of a cluster of UEs, cluster location information, or cluster motion information. In another aspect, the second safety message type may include a special group indicator field that indicates whether the received safety message is associated with a group of senior citizens, a group of children, a group of users with disabilities, or a group of emergency personnel. In one example, referring to FIG. 9, the UE may be the UE 920. The UE 920 may receive the first safety message 922 from the UE 908. The first safety message 922 may include a cluster indicator that indicates whether the first safety message 922 is the first safety message type or the second safety message type (e.g., cluster indicator=1). In this example, the first safety message 922 is the second safety message type associated with the first cluster of UEs 918. In an aspect, the first safety message 922 may indicate that the first cluster of UEs 918 is a line shape with a population of 5. In another aspect, the first safety message 922 may include a leader UE identifier (e.g., a MAC address) associated with the UE 908. In another aspect, the first safety message 922 may include cluster location information and cluster motion information. In another aspect, the first safety message 922 may include a special group indicator field that indicates the first safety message 922 is associated with a group of children. In another example, referring again to FIG. 9, the UE may be the UE 930. In this example, the UE 930 may receive the fourth safety message 932 from the UE 928. The fourth safety message 932 may include a cluster indicator that indicates whether the fourth safety message 932 is the first safety message type or the second safety message type (e.g., cluster indicator=0). In this example, the fourth safety message 932 is the first safety message type associated with the UE 928. In an aspect, the fourth safety message 932 may include location information and motion information for the UE 928.

At 1304, the UE may determine whether the received safety message is the first safety message type or the second safety message type based on the cluster indicator included in the safety message. If the cluster indicator is set to one value, the UE may determine that the first safety message is the first safety message type, but if the cluster indicator is set to a different value, the UE may determine that the first safety message is the second safety message type. In one example, referring to FIG. 9, the UE may be the UE 920. In this example, the UE 920 may determine whether the first safety message 922 is the first safety message type or the second safety message type based on the cluster indicator. In this example, the cluster indicator may be set to 1, indicating that the first safety message 922 is the second safety message type. In another example, referring to FIG. 9, the UE may be the UE 930. In this example, the UE 930 may determine whether the fourth safety message 932 is the first safety message type or the second safety message type based on the cluster indicator. In this case, the cluster indicator may be set to 0, indicating that the fourth safety message 932 is the first safety message type.

At 1306, the UE may determine whether a proximity condition between the UE and the second UE is satisfied. In an aspect, the UE may determine the whether the proximity condition is satisfied by determining whether a distance between the UE and the second UE is less than a threshold and by determining a relative motion between the UE and the second UE. In one example, referring to FIG. 9, the UE may be the UE 920. The UE 920 may determine whether the proximity condition between the UE 920 and the UE 908 is satisfied based on the first safety message 922. In an aspect, the UE 920 may determine whether the proximity condition is met between the UE 920 and the UE 908 by determining whether a distance between the UE 920 and the UE 908 is less than a distance threshold D1 and by determining the relative motion between the UE 920 and the UE 908 (e.g., whether the UE 920 and the UE 908 are headed towards each other). If the distance between UE 908 and the UE 920 is less than the distance threshold, and the UE 908 and the UE 920 are headed towards each other, then the UE 920 may determine that the proximity condition is met. Otherwise, if the distance is greater than the threshold or the UE 908 and the UE 920 are headed away from each other, then the proximity condition is not met. In another example, referring to FIG. 9, the UE may be the UE 930. The UE 930 may determine whether the proximity condition between the UE 928 and the UE 930 is satisfied based on the fourth safety message 932.

At 1308, the UE may determine whether the UE is in a standalone mode or a cluster member mode. The UE may determine the mode based on a state variable stored within the UE. If the state variable is set to one value, the UE may be in cluster member mode, and if the state variable is set to a different value, the UE may be in a standalone mode. To represent 2 modes, the state variable may be a bit indicator. To represent 3 modes (e.g., standalone mode, cluster member mode, and leader UE mode), the state variable may be a 2-bit indicator (e.g., 00=standalone mode, 01=cluster member mode, 11=leader UE mode). In one example, referring to FIG. 9, the UE may be the UE 920. The UE 920 may determine that the UE 920 is in a standalone mode. In another example, referring to FIG. 9, the UE may be the UE 910. The UE 910 may determine that the UE 910 is in a cluster member mode. At 1308, the UE may perform different actions depending on whether the UE is in a standalone mode or cluster member mode. Such actions may also depend on whether the UE receives a safety message of the first safety message type or the second safety message type.

Figure 14:
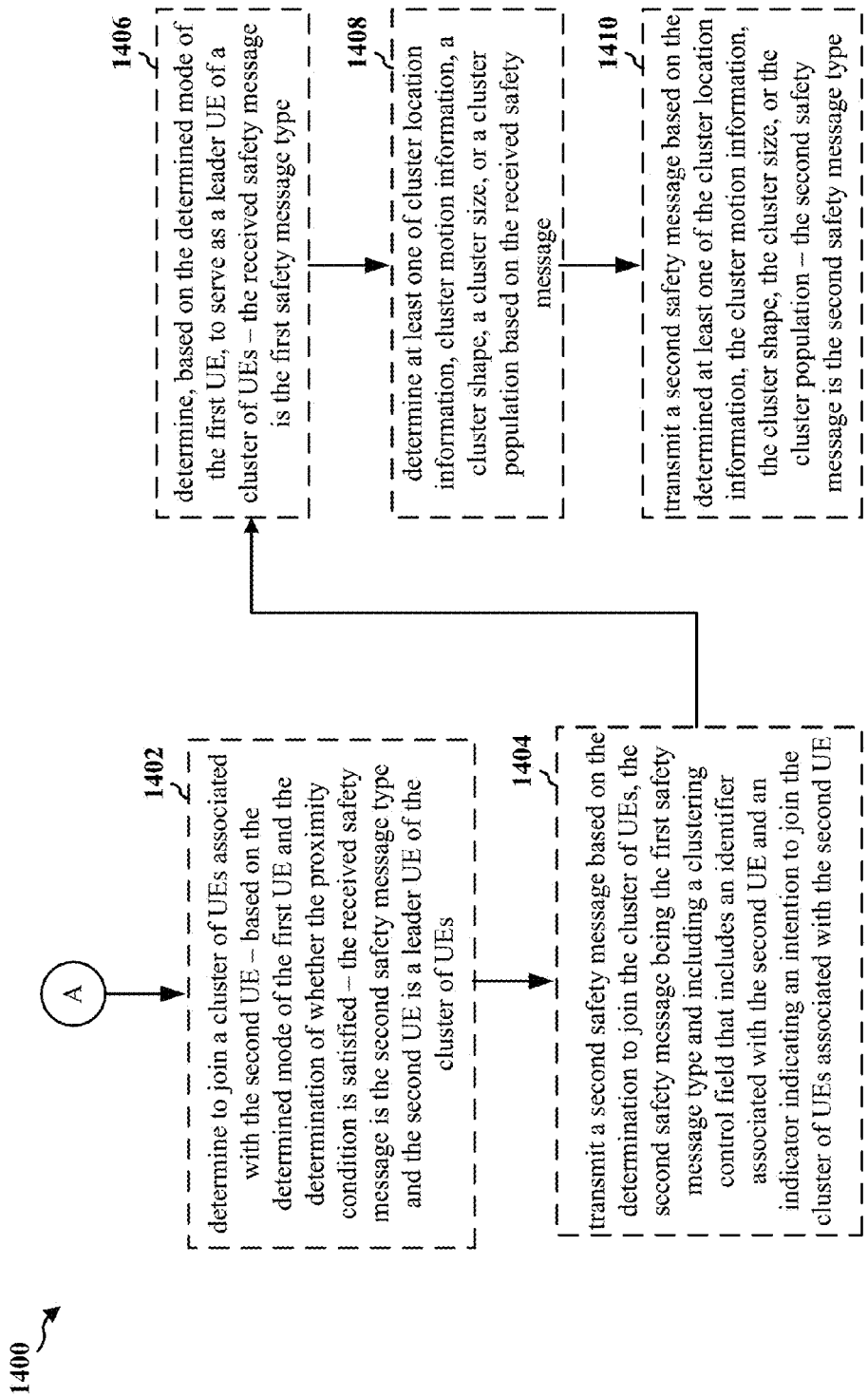
Figure 15:
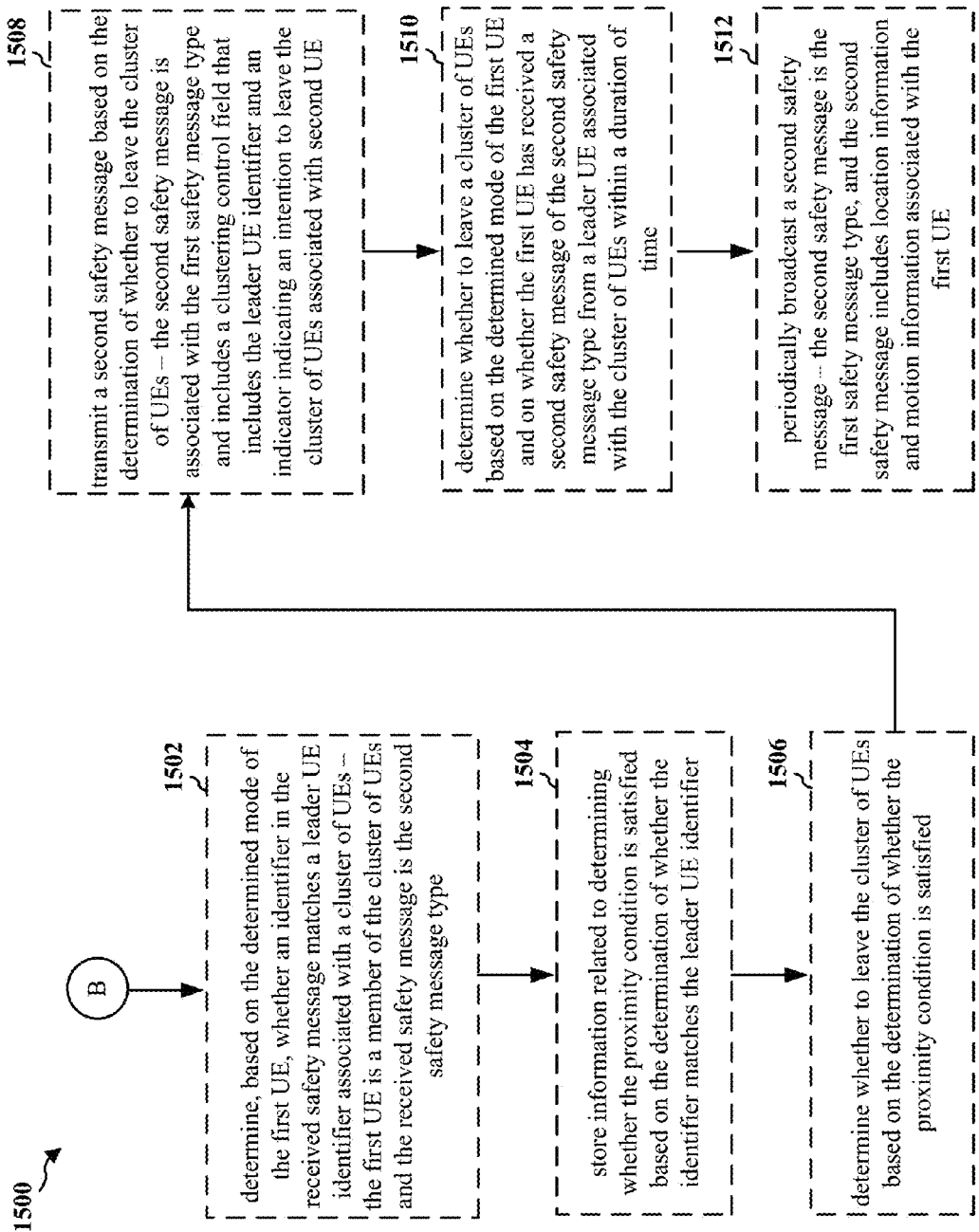

FIGS. 14 and 15 illustrate different actions that may be taken by a UE depending on the mode of the UE and the type of safety message received.

In one configuration, the UE may be in a standalone mode and may receive a safety message of the second safety message type. Referring to FIG. 14, at 1402, the UE may determine to join a cluster of UEs associated with the second UE based on the determined mode of the UE and based on the determination of whether the proximity condition is satisfied. The received safety message may be the second safety message type and the second UE may be a leader UE of the cluster of UEs. For example, referring to FIG. 9, the UE 920 may be in a standalone mode and not associated with any UE clusters. The UE 920 may determine to join the first cluster of UEs 918 associated with the UE 908 based on the UE 920 being in a standalone mode and based on the determination that the proximity condition between the UE 908 and the UE 920 is satisfied. In this example, the first safety message 922 is the second safety message type and the UE 908 is the leader UE of the first cluster of UEs 918.

At 1404, the UE may transmit a second safety message based on the determination to join the cluster of UEs. The second safety message may be the first safety message type and may include a clustering control field that includes an identifier associated with the second UE and an indicator indicating an intention to join the cluster of UEs associated with the second UE. Referring to FIG. 9, the UE 920 may transmit the second safety message 924 based on the determination to join the first cluster of UEs 918. The second safety message 924 is the first safety message type (e.g., a BSM) and includes an identifier associated with the UE 908. The second safety message 924 may indicate an intention to join the first cluster of UEs 918 associated with the UE 908.

In another configuration, the UE may be in a standalone mode and receive a safety message of the first safety message type. Referring to FIG. 14, at block 1406, the UE may determine, based on the determined mode of the UE, to serve as a leader UE of a cluster of UEs when the received safety message is the first safety message type. For example, referring to FIG. 9, the UE may be the UE 930. The UE 930 may receive the fourth safety message 932 of the first safety message type. The UE 930 may have performed one or more of the functions discussed at blocks 1302-1308. Then, at 1406, the UE 930 may determine to serve as a leader UE of the second cluster of UEs 934 based on the UE 930 being in a standalone mode. The decision for the UE 930 to serve as the leader UE may also be based on a random selection among other standalone UEs or a remaining battery level of the UE 930.

At 1408, having determined to serve as the leader UE, the UE may determine at least one of a cluster shape, a cluster size, or a cluster population based on the received safety message. For example, referring to FIG. 9, the UE may be the UE 930. The UE 930 may determine that the second cluster of UEs 934 is shaped like a line based on the location of the UE 930 and the UE 928. The UE 930 may determine a cluster size (e.g., 1 meter) based on a distance between the UE 928 and the UE 930. The UE may determine a cluster population of 2 based on the second cluster of UEs 934 having 2 UEs.

At 1410, the UE may transmit a second safety message based on the determined at least one of the cluster shape, the cluster size, or the cluster population. The second safety message may be a second safety message type. For example, referring to FIG. 9, the UE may be the UE 930. The UE 930 may transmit the fifth safety message 936 based on the determined cluster shape, size, and population. The fifth safety message 936 may be the second safety message type.

In another configuration, unlike in FIG. 14, the UE may be in a cluster member mode (e.g., associated with a UE cluster). Referring to FIG. 15, at 1502, the UE may determine, based on the determined mode of the UE, whether an identifier in the received safety message matches a leader UE identifier associated with a cluster of UEs. In an aspect, the UE may compare the identifier in the received safety message with a stored leader UE identifier. The UE may be a member of the cluster of UEs and the received safety message may be the second safety message type. For example, referring to FIG. 9, the UE may be the UE 910. The UE 910 may determine, based on the UE 910 being in a cluster member mode, whether an identifier in the third safety message 926 matches an identifier of the leader UE, UE 908, associated with the first cluster of UEs 918. The UE 910 may have stored the leader UE identifier associated with the first cluster of UEs 918. In this example, the UE 910 is a member of the first cluster of UEs 918 and the third safety message 926 is the second safety message type.

At 1504, the UE may store information related to the determining whether the proximity condition is satisfied (e.g., at 1306) based on the determination of whether the identifier matches the leader UE identifier. For example, referring to FIG. 9, the UE may be the UE 910. If the leader UE identifier in the third safety message 926 matches the UE 908, then the UE 910 may store information related determining whether the proximity condition between the UE 908 and the UE 910 is satisfied based on the third safety message 926. In an aspect, the information may include a distance between the UE 908 and the UE 910. The information may include a heading (e.g., speed and/or direction) of the UE 908 and the UE 910. The information may include an angle between the headings of the UE 908 and the UE 910.

At 1506, the UE may determine whether to leave the cluster of UEs based on the determination of whether the proximity condition is satisfied. For example, referring to FIG. 9, the UE may be the UE 910. The UE 910 may determine to leave the first cluster of UEs 918 if the proximity condition is not satisfied, and the UE 910 may determine to remain with the first cluster of UEs 918 if the proximity condition is satisfied.

At block 1508, the UE may transmit a second safety message based on the determination of whether to leave the cluster of UEs. The second safety message may be associated with the first safety message type and may include a clustering control field that includes the leader UE identifier and an indicator indicating an intention to leave the cluster of UEs associated with second UE. For example, referring to FIG. 9, the UE may be the UE 910. The UE 910 may transmit a safety message (not pictured) based on the determination to leave the first cluster of UEs 918. The safety message is of the first safety message type and includes a clustering control field that includes the leader UE identifier associated with the UE 908 (e.g., a MAC address) and an indicator indicating that the UE 910 will leave the first cluster of UEs 918 associated with the UE 908.

In another aspect, the UE in cluster member mode may not have received a safety message from the leader UE of the cluster for a duration of time. At 1510, the UE may determine whether to leave a cluster of UEs based on the determined mode of the UE and on whether the UE has received a second safety message of the second safety message type from the leader UE associated with the cluster of UEs within a duration of time. For example, referring to FIG. 9, after receiving the third safety message 926, the UE 910 may not have received another safety message from the UE 908 for some time. The UE 910 may determine whether to leave the first cluster of UEs 918 based on the UE 910 being in cluster member mode and based on the UE 910 having not received a safety message of the second safety message type from the UE 908 within the last minute (or some other amount of time). If the UE 910 determines to leave the first cluster of UEs 918, then the UE 910 may transmit a safety message of the first safety message type to indicate that the UE 910 intends to leave the first cluster of UEs 918.

In another aspect, at block 1512, the UE may periodically broadcast a second safety message. The second safety message may be the first safety message type, and the second safety message may include location information and motion information associated with the UE. For example, referring to FIG. 9, the UE may be the UE 910. The UE 910 may periodically broadcast a safety message of the first safety message type to provide the UE 908 with updated location and motion information associated with the UE 910. The UE 908 may use the new location/motion information broadcasted by the UE 910 to update cluster information (e.g., cluster shape, size, motion, location, etc.).

Figure 16:
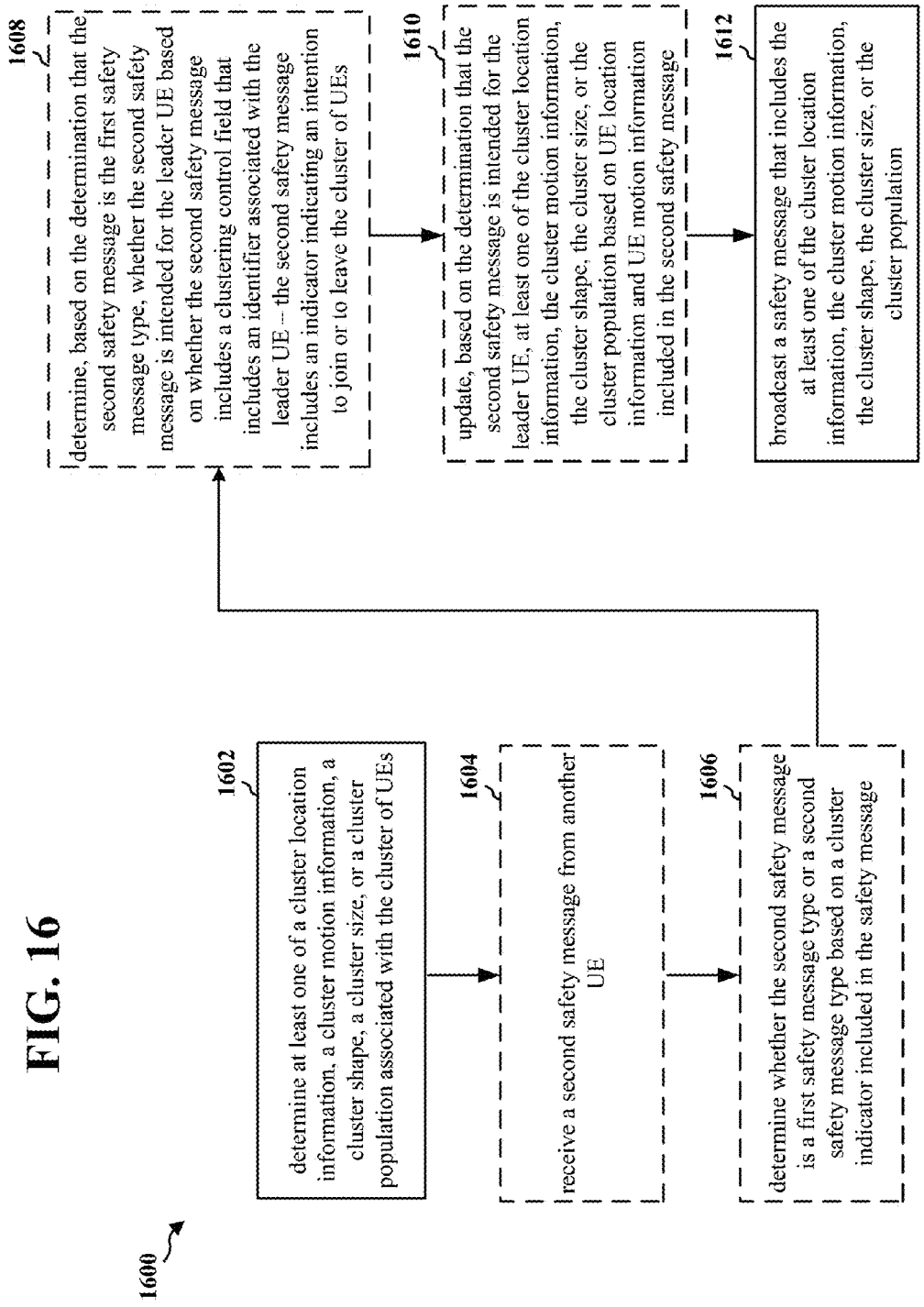

FIG. 16 is a flowchart 1600 of a method of wireless communication. The method may be performed by a UE (e.g., the UE 908, the apparatus 1902/1902', infra). At 1602, the UE may determine at least one of a cluster location information, a cluster motion information, a cluster shape, a cluster size, or a cluster population associated with the cluster of UEs. For example, referring to FIG. 9, the UE may be the UE 908. The UE 908 may determine cluster location information, cluster motion information, cluster shape, and/or cluster population associated with the first cluster of UEs 918.

At block 1604, the UE may receive a second safety message from another UE. For example, referring to FIG. 9, the UE 908 may receive the second safety message 924 from the UE 920.

At block 1606, the UE may determine whether the second safety message is a first safety message type or a second safety message type based on a cluster indicator included in the safety message. For example, referring to FIG. 9, the UE 908 may determine that the second safety message 924 is a first safety message type based on the cluster indicator being set to 0.

At block 1608, the UE may determine, based on the determination that the second safety message is the first safety message type, whether the second safety message is intended for the leader UE based on whether the second safety message includes a clustering control field that includes an identifier associated with the leader UE. The second safety message may include an indicator indicating an intention to join or to leave the cluster of UEs. For example, referring to FIG. 9, the UE 908 may determine, based on the determination that the second safety message 924 is the first safety message type, that the second safety message 924 is intended for the UE 908 based on the identifier in the clustering control field that is associated with the UE 908. The second safety message 924 may include an indicator indicating an intention to join the first cluster of UEs 918.

At 1610, the UE may update, based on the determination that the second safety message is intended for the leader UE, at least one of the cluster location information, the cluster motion information, the cluster shape, the cluster size, or the cluster population based on UE location information and UE motion information included in the second safety message.

For example, referring to FIG. 9, the UE 908 may determine, based on the determination that the second safety message 924 is intended for the UE 908, an updated cluster size and cluster population based on the UE location information and UE motion information included in the second safety message 924. That is, if the second safety message 924 is not intended for the UE 908, then the UE 908 may not update the cluster information, but if the second safety message 924 is intended for the UE 908, then the UE 908 may update cluster information.

At 1612, the UE may broadcast a safety message that includes the at least one of the cluster location information, the cluster motion information, the cluster shape, the cluster size, or the cluster population. For example, referring to FIG. 9, the UE may be the UE 908. In one aspect, if the UE 908 did not receive any safety messages that would necessitate an update of cluster information, then the UE may broadcast a safety message that includes a previously determined cluster location information, cluster motion information, and cluster shape. In another aspect, if the UE 908 received the second safety message 924 indicating that the UE 920 has joined the cluster, the UE 908 may broadcast the third safety message 926 that includes an updated cluster shape, cluster size, and cluster population.

Figure 17:
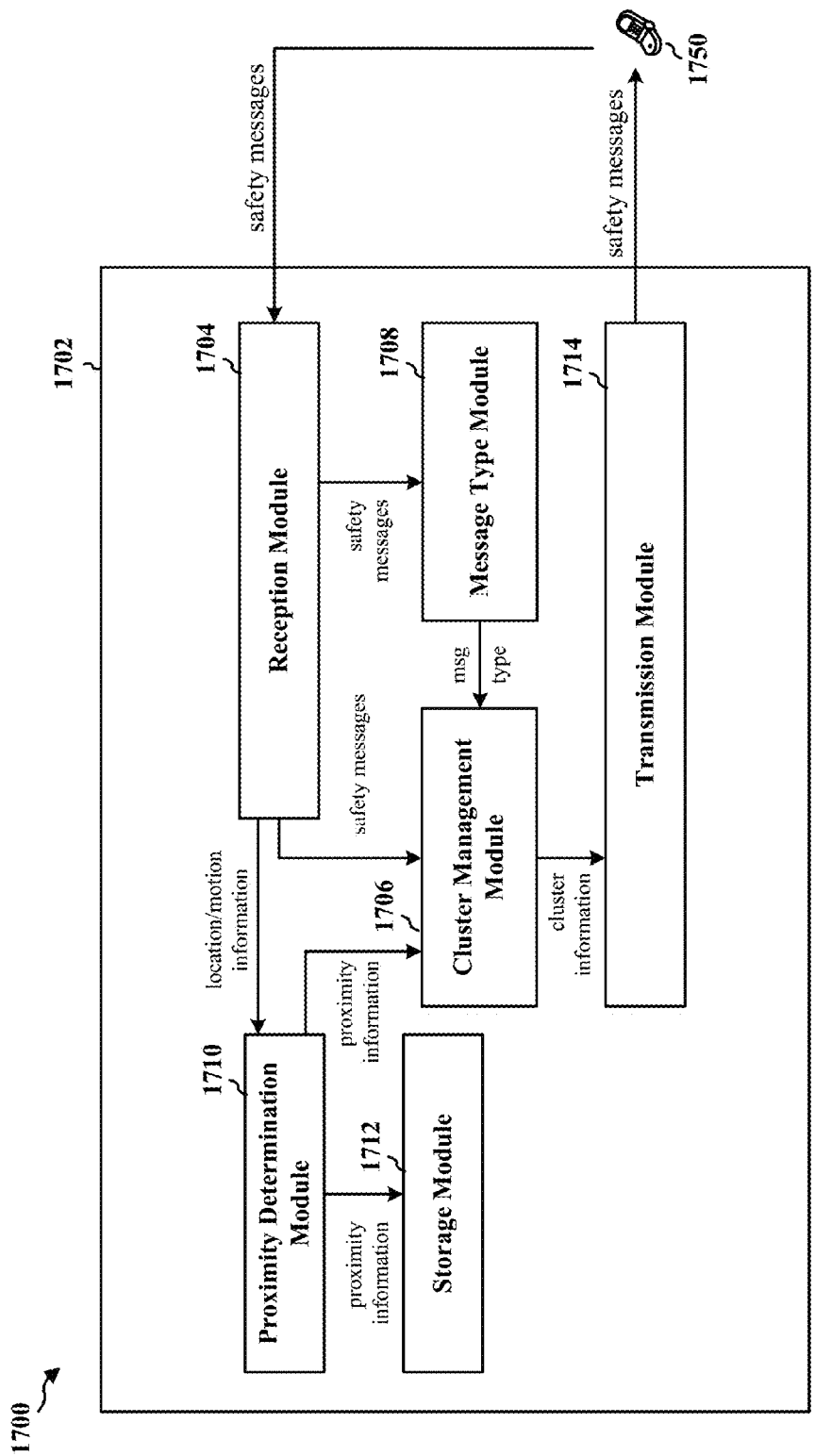
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a UE. The apparatus includes a reception module 1704, a cluster management module 1706, a message type module 1708, a proximity determination module 1710, a storage module 1712, and a transmission module 1714. The reception module may be configured to receive a safety message from a second UE. The received safety message may include a cluster indicator that indicates whether the received safety message is a first safety message type or a second safety message type. The first safety message type may be associated with a single UE and the second safety message type is associated with multiple UEs. The message type module 1708 may be configured to determine whether the received safety message is the first safety message type or the second safety message type based on the cluster indicator included in the safety message. The proximity determination module 1710 may be configured to determine whether a proximity condition between the apparatus and the second UE is satisfied based on the received safety message. In an aspect, the first safety message type may include location information and motion information for the single UE, and the second safety message type may include at least one of a cluster shape field, a cluster size field, or a cluster population field. In another aspect, the cluster shape field, the cluster size field, and the cluster population field of the second safety message type are associated with multiple UEs. In another aspect, the first safety message type may include a clustering control field that includes a leader UE identifier associated with a leader UE of a cluster of UEs and an indicator indicating an intention to join or to leave the cluster of UEs. In another aspect, the second safety message type may include a leader UE identifier associated with a leader of a cluster of UEs, cluster location information, or cluster motion information. In another aspect, the second safety message type may include a special group indicator field that indicates whether the received safety message is associated with a group of senior citizens, a group of children, a group of users with disabilities, or a group of emergency personnel. In one configuration, the proximity determination module 1710 may be configured to determine whether the proximity condition between the apparatus and the second UE is satisfied by determining whether a distance between the apparatus and the second UE is less than a threshold and by determining a relative motion between the apparatus and the second UE. In another configuration, the cluster management module 1706 may be configured to determine a mode of the apparatus, in which the mode is a standalone mode or a cluster member mode. In another configuration, the cluster management module 1706 may be configured to determine to join a cluster of UEs associated with the second UE based on the determined mode of the apparatus and the determination of whether the proximity condition is satisfied. In this configuration, the received safety message may be the second safety message type and the second UE may be a leader UE of the cluster of UEs. In this configuration, the transmission module 1714 may be configured to transmit a second safety message based on the determination to join the cluster of UEs. The second safety message may be the first safety message type and may include a clustering control field that includes an identifier associated with the second UE and an indicator indicating an intention to join the cluster of UEs associated with the second UE. In another configuration, the cluster management module 1706 may be configured to determine, based on the determined mode of the apparatus, whether an identifier in the received safety message matches a leader UE identifier associated with a cluster of UEs. In this configuration, the apparatus may be a member of the cluster of UEs and the received safety message may be the second safety message type. In this configuration, the storage module 1712 may be configured to store information related to determining whether the proximity condition is satisfied based on the determination of whether the identifier matches the leader UE identifier. In this configuration, the cluster management module 1706 may be configured to determine whether to leave the cluster of UEs based on the determination of whether the proximity condition is satisfied and based on the determination of whether the identifier matches the leader UE identifier. In another configuration, the transmission module 1714 may be configured to transmit a second safety message based on the determination of whether to leave the cluster of UEs. In this configuration, the second safety message may be associated with the first safety message type and may include a clustering control field that includes the leader UE identifier and an indicator indicating an intention to leave the cluster of UEs associated with second UE. In another configuration, the cluster management module 1706 may be configured to determine, based on the determined mode of the apparatus, to serve as a leader UE of a cluster of UEs that includes the apparatus and the second UE. In this configuration, the received safety message may be the first safety message type. In this configuration, the cluster management module 1706 may be configured to determine at least one of a cluster location information, a cluster motion information, a cluster shape, a cluster size, or a cluster population based on the received safety message. In this configuration, the transmission module 1714 may be configured to transmit a second safety message based on the determined at least one of the cluster location information, the cluster motion information, the cluster shape, the cluster size, or the cluster population. In this configuration, the second safety message may be the second safety message type. In another configuration, the cluster management module 1706 may be configured to determine whether to leave a cluster of UEs based on the determined mode of the apparatus and on whether the apparatus has received a second safety message of the second safety message type from a leader UE associated with the cluster of UEs within a duration of time. In yet another configuration, the transmission module 1714 may be configured to periodically broadcast a second safety message. The second safety message may be the first safety message type, and the second safety message may include location information and motion information associated with the apparatus.

The apparatus may include additional modules that perform each of the blocks of the algorithm in the aforementioned flowcharts of FIGS. 13, 14, and 15. As such, each block in the aforementioned flowcharts of FIGS. 13, 14, and 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
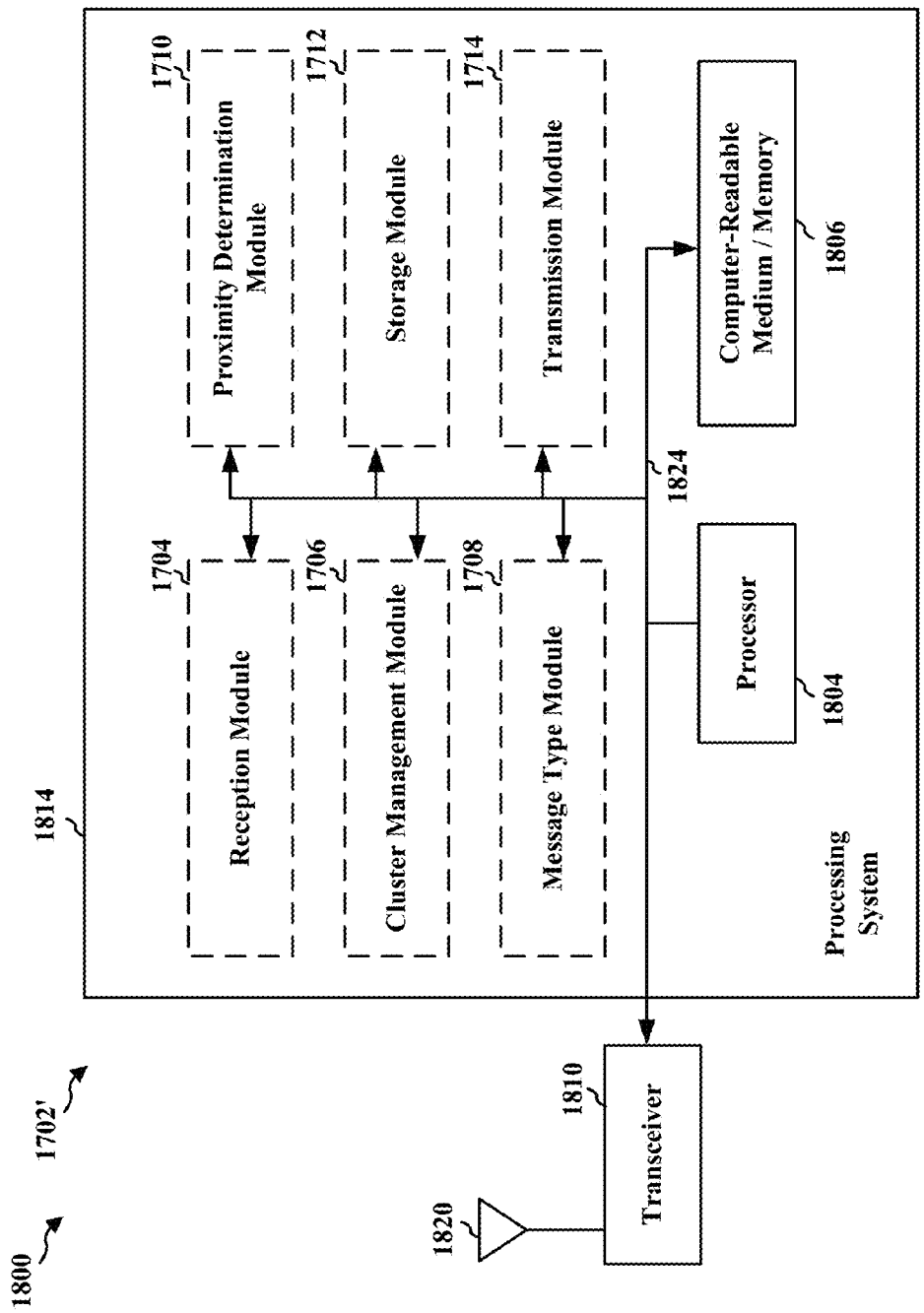
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, 1712, 1714, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception module 1704. In addition, the transceiver 1810 receives information from the processing system 1814, specifically the transmission module 1714, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the module 1704, 1706, 1708, 1710, 1712, 1714. The modules may be software modules running in the processor 1804, resident/stored in the computer readable medium/memory 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In one configuration, the apparatus 1702/1702' for wireless communication includes means for receiving a safety message from a second UE. The received safety message may include a cluster indicator that indicates whether the received safety message is a first safety message type or a second safety message type. The first safety message type may be associated with a single UE and the second safety message type may be associated with multiple UEs. The apparatus includes means for determining whether the received safety message is the first safety message type or the second safety message type based on the cluster indicator included in the safety message. The apparatus includes means for determining whether a proximity condition between the apparatus and the second UE is satisfied based on the received safety message. In an aspect, the first safety message type may include location information and motion information for the single UE, and the second safety message type may include at least one of a cluster shape field, a cluster size field, or a cluster population field. The cluster shape field, the cluster size field, and the cluster population field of the second safety message type may be associated with multiple UEs. In another aspect, the first safety message type may include a clustering control field that includes a leader UE identifier associated with a leader UE of a cluster of UEs and an indicator indicating an intention to join or to leave the cluster of UEs. In another aspect, the second safety message type may include a leader UE identifier associated with a leader of a cluster of UEs, cluster location information, or cluster motion information. In another aspect, the second safety message type may include a special group indicator field that indicates whether the received safety message is associated with a group of senior citizens, a group of children, a group of users with disabilities, or a group of emergency personnel. In one configuration, the means for determining whether the proximity condition between the apparatus and the second UE is configured to determine whether a distance between the apparatus and the second UE is less than a threshold and to determine a relative motion between the apparatus and the second UE. In another configuration, the apparatus may include means for determining a mode of the apparatus, in which the mode is a standalone mode or a cluster member mode. In another configuration, the apparatus may include means for determining to join a cluster of UEs associated with the second UE based on the determined mode of the apparatus and the determination of whether the proximity condition is satisfied. In this configuration, the received safety message may be the second safety message type and the second UE may be a leader UE of the cluster of UEs. In this configuration, the apparatus may include means for transmitting a second safety message based on the determination to join the cluster of UEs. The second safety message may be the first safety message type and may include a clustering control field that includes an identifier associated with the second UE and an indicator indicating an intention to join the cluster of UEs associated with the second UE. In another configuration, the apparatus may include means for determining, based on the determined mode of the apparatus, whether an identifier in the received safety message matches a leader UE identifier associated with a cluster of UEs. The apparatus may be a member of the cluster of UEs and the received safety message may be the second safety message type. In this configuration, the apparatus may include means for storing information related to determining whether the proximity condition is satisfied based on the determination of whether the identifier matches the leader UE identifier. Also in this configuration, the apparatus may include means for determining whether to leave the cluster of UEs based on the determination of whether the proximity condition is satisfied and based on the determination of whether the identifier matches the leader UE identifier. In another configuration, the apparatus may include means for transmitting a second safety message based on the determination of whether to leave the cluster of UEs. The second safety message may be associated with the first safety message type and may include a clustering control field that includes the leader UE identifier and an indicator indicating an intention to leave the cluster of UEs associated with second UE. In another configuration, the apparatus may include means for determining, based on the determined mode of the apparatus, to serve as a leader UE of a cluster of UEs that includes the apparatus and the second UE. The received safety message may be the first safety message type. In this configuration, the apparatus may include means for determining at least one of cluster location information, cluster motion information, a cluster shape, a cluster size, or a cluster population based on the received safety message. In this configuration, the apparatus may include means for transmitting a second safety message based on the determined at least one of the cluster location information, the cluster motion information, the cluster shape, the cluster size, or the cluster population. The second safety message may be the second safety message type. In another configuration, the apparatus may include means for determining whether to leave a cluster of UEs based on the determined mode of the apparatus and on whether the apparatus has received a second safety message of the second safety message type from a leader UE associated with the cluster of UEs within a duration of time. In yet another configuration, the apparatus may include means for periodically broadcasting a second safety message. The second safety message may be the first safety message type, and the second safety message may include location information and motion information associated with the apparatus. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 19:
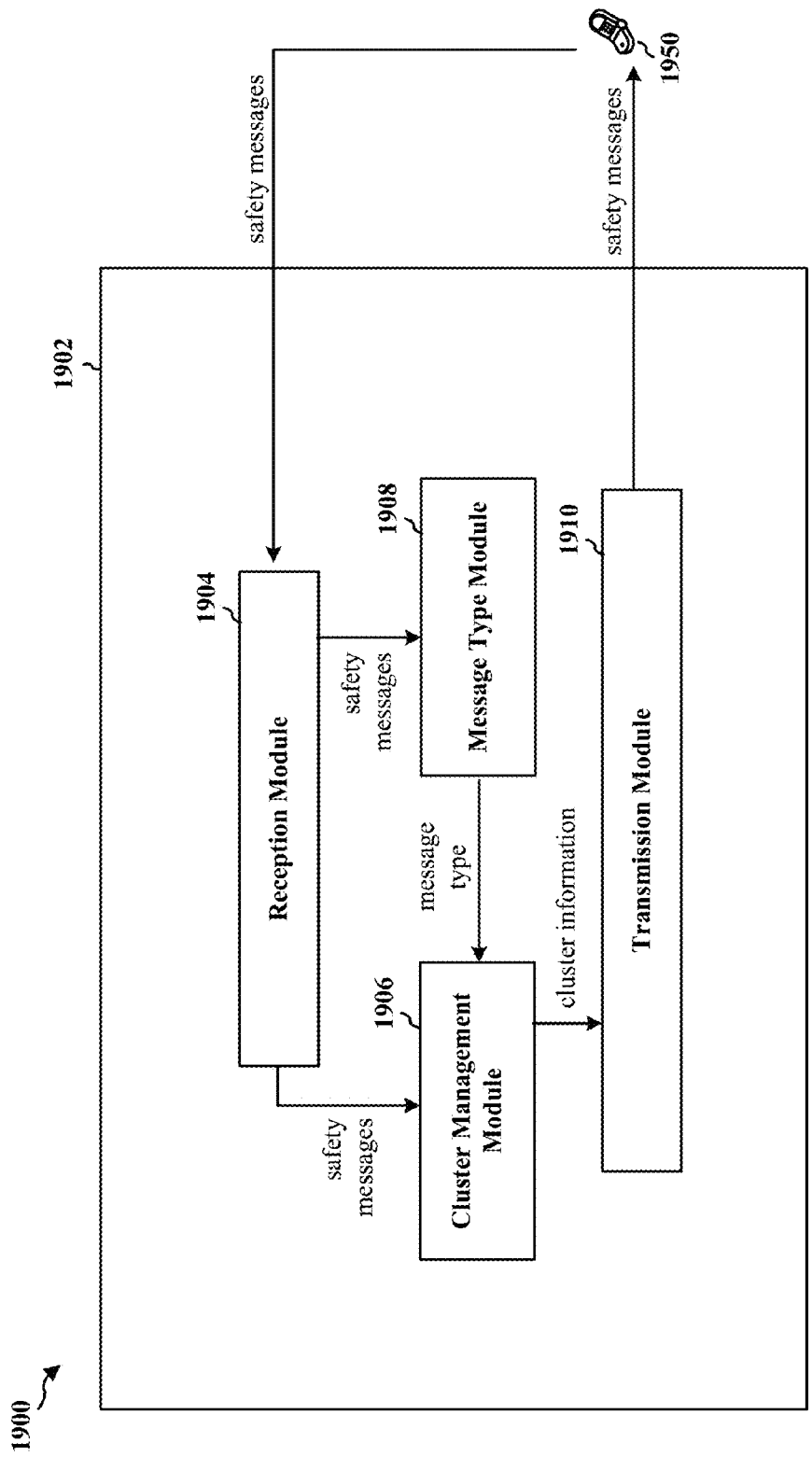
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1902. The apparatus may be a UE. The apparatus includes a reception module 1904, a cluster management module 1906, a message type module 1908, and a transmission module 1910. The cluster management module 1906 may be configured to determine at least one of a cluster location information, a cluster motion information, a cluster shape, a cluster size, or a cluster population associated with the cluster of UEs. The transmission module 1910 may be configured to broadcasting a safety message that includes the at least one of the cluster location information, the cluster motion information, the cluster shape, the cluster size, or the cluster population. In one configuration, the reception module 1904 may be configured to receive a second safety message from another UE. In the configuration, the cluster management module 1906 may be configured to determine whether the second safety message is a first safety message type or a second safety message type based on a cluster indicator included in the safety message. In another configuration, the cluster management module 1906 may be configured to determine, based on the determination that the second safety message is the first safety message type, whether the second safety message is intended for the apparatus based on whether the second safety message includes a clustering control field that includes an identifier associated with the apparatus. In this configuration, the second safety message may include an indicator indicating an intention to join or to leave the cluster of UEs. In another configuration, the cluster management module 1906 may be configured to update, based on the determination that the second safety message is intended for the apparatus, at least one of the cluster location information, the cluster motion information, the cluster shape, the cluster size, or the cluster population based on UE location information and UE motion information included in the second safety message. In another aspect, the broadcasted safety message may include a special group indicator field that indicates whether the broadcasted safety message is associated with a group of senior citizens, a group of children, a group of users with disabilities, or a group of emergency personnel.

The apparatus may include additional modules that perform each of the blocks of the algorithm in the aforementioned flowchart of FIG. 16. As such, each block in the aforementioned flowchart of FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
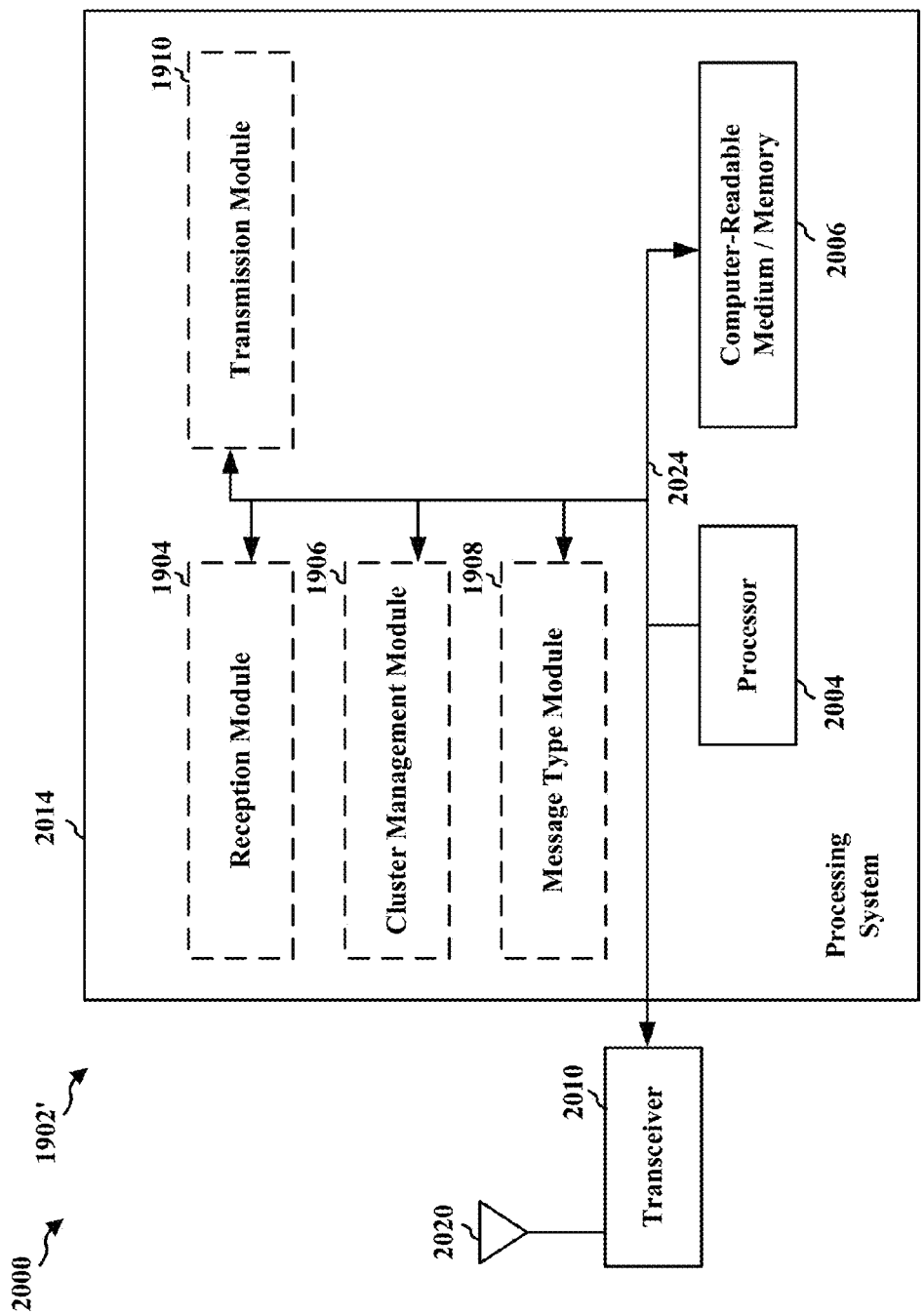
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1904, 1906, 1908, 1910, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception module 1904. In addition, the transceiver 2010 receives information from the processing system 2014, specifically the transmission module 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the modules 1904, 1906, 1908, 1910. The modules may be software modules running in the processor 2004, resident/stored in the computer readable medium/memory 2006, one or more hardware modules coupled to the processor 2004, or some combination thereof. The processing system 2014 may be a component of the UE 650 and may include the memory 660 and/or at least one of the TX processor 668, the RX processor 656, and the controller/processor 659.

In one configuration, the apparatus 1902/1902' for wireless communication includes means for determining at least one of cluster location information, luster motion information, a cluster shape, a cluster size, or a cluster population associated with the cluster of UEs. The apparatus includes mean for broadcasting a safety message that includes the at least one of the cluster location information, the cluster motion information, the cluster shape, the cluster size, or the cluster population. In one configuration, the apparatus may include means for receiving a second safety message from another UE. In this configuration, the apparatus may include means for determining whether the second safety message is a first safety message type or a second safety message type based on a cluster indicator included in the safety message. In another configuration, the apparatus may include means for determining, based on the determination that the second safety message is the first safety message type, whether the second safety message is intended for the apparatus based on whether the second safety message includes a clustering control field that includes an identifier associated with the apparatus. In this configuration, the second safety message may include an indicator indicating an intention to join or to leave the cluster of UEs. In yet another configuration, the apparatus may include means for updating, based on the determination that the second safety message is intended for the leader UE, at least one of the cluster location information, the cluster motion information, the cluster shape, the cluster size, or the cluster population based on UE location information and UE motion information included in the second safety message. In an aspect, the broadcasted safety message may include a special group indicator field that indicates whether the broadcasted safety message is associated with a group of senior citizens, a group of children, a group of users with disabilities, or a group of emergency personnel. The aforementioned means may be one or more of the aforementioned modules of the apparatus 1902 and/or the processing system 2014 of the apparatus 1902' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of a wireless communication by a first user equipment (UE), comprising:
    receiving a safety message from a second UE, wherein the received safety message includes a cluster indicator that indicates whether the received safety message is a first safety message type or a second safety message type, wherein the first safety message type is associated with and includes information about a single UE, and wherein the second safety message type is associated with and includes information about multiple UEs;
    determining whether the received safety message is the first safety message type or the second safety message type based on the cluster indicator included in the safety message;
    determining whether a proximity condition between the first UE and the second UE is satisfied based on the received safety message;
    determining a mode of the first UE, the mode of the first UE being one of a standalone mode that indicates the first UE is not a member of any cluster of UEs, or a cluster member mode that indicates the first UE is a member of a cluster of UEs; and
    determining, when the first UE is in a cluster member mode where the first UE is a member of a cluster of UEs associated with the second UE, whether to leave the cluster of UEs based on successful matching of an identifier in the received safety message with a leader UE identifier associated with the cluster of UEs and based on the determination of whether the proximity condition is satisfied.

2. The method of claim 1, wherein the first safety message type comprises location information and motion information for the single UE, wherein the second safety message type comprises at least one of a cluster shape field, a cluster size field, or a cluster population field, and wherein the cluster shape field, the cluster size field, and the cluster population field of the second safety message type are associated with multiple UEs.

3. The method of claim 1, wherein the first safety message type further comprises a clustering control field that includes a leader UE identifier associated with a leader UE of a cluster of UEs and an indicator indicating an intention to join or to leave the cluster of UEs.

4. The method of claim 1, wherein the second safety message type further comprises a leader UE identifier associated with a leader of a cluster of UEs, cluster location information, or cluster motion information.

5. The method of claim 4, wherein the second safety message type further comprises a special group indicator field that indicates whether the received safety message is associated with a group of senior citizens, a group of children, a group of users with disabilities, or a group of emergency personnel.

6. The method of claim 1, wherein the received safety message is the second safety message type, and comprises cluster location information associated with multiple UEs that are members of a cluster of UEs, the cluster location information indicating a reference point associated with a shape of the cluster of UEs; and
    wherein the determining whether the proximity condition between the first UE and the second UE is satisfied is based on the cluster location information, and comprises:
    determining, based on the cluster location information, whether a distance between the first UE and the second UE is less than a threshold; and
    determining a relative motion between the first UE and the second UE.

7. The method of claim 1, further comprising:
    determining to join the cluster of UEs associated with the second UE when the determined mode of the first UE is the standalone mode and the proximity condition is satisfied, wherein the received safety message is the second safety message type and the second UE is a leader UE of the cluster of UEs; and
    transmitting a second safety message based on the determination to join the cluster of UEs, the second safety message being the first safety message type and including a clustering control field that includes an identifier associated with the second UE and an indicator indicating an intention to join the cluster of UEs associated with the second UE.

8. The method of claim 1,
    wherein the received safety message is the second safety message type, the method further comprising:
    storing information related to determining whether the proximity condition is satisfied based on the successful matching of the identifier with the leader UE identifier.

9. The method of claim 8, further comprising transmitting a second safety message based on the determination of whether to leave the cluster of UEs, wherein the second safety message is associated with the first safety message type and includes a clustering control field that includes the leader UE identifier and an indicator indicating an intention to leave the cluster of UEs associated with second UE.

10. The method of claim 1, further comprising:
    determining, when the determined mode of the first UE is the standalone mode, to serve as a leader UE of the cluster of UEs that includes the first UE and the second UE, wherein the received safety message is the first safety message type;
    determining at least one of cluster location information, cluster motion information, a cluster shape, a cluster size, or a cluster population based on the received safety message; and
    transmitting a second safety message based on the determined at least one of the cluster location information, the cluster motion information, the cluster shape, the cluster size, or the cluster population, wherein the second safety message is the second safety message type.

11. The method of claim 1, wherein the determining whether to leave the cluster of UEs when the determined mode of the first UE is the cluster member mode is further based on whether the first UE has received a second safety message of the second safety message type from a leader UE associated with the cluster of UEs within a duration of time.

12. The method of claim 1, further comprising periodically broadcasting a second safety message, wherein the second safety message is the first safety message type, and the second safety message includes location information and motion information associated with the first UE.

13. The method of claim 1, wherein the received safety message is the second safety message type and comprises cluster shape of the cluster of UEs.

14. The method of claim 13, wherein the received safety message further comprises cluster size information indicating a size of the cluster of UEs, the size of the cluster of UEs being dependent on the cluster shape.

15. An apparatus for wireless communication, the apparatus being a first user equipment (UE) and comprising:
    a memory; and
    at least one processor coupled to the memory and configured to:
        receive a safety message from a second UE, wherein the received safety message includes a cluster indicator that indicates whether the received safety message is a first safety message type or a second safety message type, wherein the first safety message type is associated with and includes information about a single UE, and wherein the second safety message type is associated with and includes information about multiple UEs;
        determine whether the received safety message is the first safety message type or the second safety message type based on the cluster indicator included in the safety message;
        determine whether a proximity condition between the first UE and the second UE is satisfied based on the received safety message;
        determine a mode of the first UE, the mode of the first UE being one of a standalone mode that indicates the first UE is not a member of any cluster of UEs, or a cluster member mode that indicates the first UE is a member of a cluster of UEs; and
        determine, when the first UE is in a cluster member mode where the first UE is a member of a cluster of UEs associated with the second UE, whether to leave the cluster of UEs based on successful matching of an identifier in the received safety message with a leader UE identifier associated with the cluster of UEs and based on the determination of whether the proximity condition is satisfied.

16. The apparatus of claim 15, wherein the received safety message is of the second safety message type, and comprises cluster location information associated with multiple UEs that are members of a cluster of UEs, the cluster location information indicating a reference point associated with a shape of the cluster of UEs; and wherein the at least one processor is configured to determine whether the proximity condition between the first UE and the second UE is satisfied based on the cluster location information by:
- determining, based on the cluster location information, whether a distance between the first UE and the second UE is less than a threshold; and
- determining a relative motion between the first UE and the second UE.

17. The apparatus of claim 15, wherein the at least one processor is further configured to:
- determine to join the cluster of UEs associated with the second UE when the determined mode of the first UE is the standalone mode and the proximity condition is satisfied, wherein the received safety message is the second safety message type and the second UE is a leader UE of the cluster of UEs; and
- transmit a second safety message based on the determination to join the cluster of UEs, the second safety message being the first safety message type and including a clustering control field that includes an identifier associated with the second UE and an indicator indicating an intention to join the cluster of UEs associated with the second UE.

18. The apparatus of claim 15, wherein the
received safety message is the second safety message type; and wherein the at least one processor is further configured to:
store information related to determining whether the proximity condition is satisfied based on the successful matching of the identifier with the leader UE identifier.

19. The apparatus of claim 18, wherein the at least one processor is further configured to transmit a second safety message based on the determination of whether to leave the cluster of UEs, wherein the second safety message is associated with the first safety message type and includes a clustering control field that includes the leader UE identifier and an indicator indicating an intention to leave the cluster of UEs associated with second UE.

20. The apparatus of claim 15, wherein the at least one processor is further configured to:
- determine, when the determined mode of the first UE is the standalone mode, to serve as a leader UE of the cluster of UEs that includes the first UE and the second UE, wherein the received safety message is the first safety message type;
- determine at least one of cluster location information, cluster motion information, a cluster shape, a cluster size, or a cluster population based on the received safety message; and
- transmit a second safety message based on the determined at least one of the cluster location information, the cluster motion information, the cluster shape, the cluster size, or the cluster population, wherein the second safety message is the second safety message type.

21. The apparatus of claim 15, wherein the determining whether to leave the cluster of UEs when the determined mode of the first UE is the cluster member mode is further based on whether the first UE has received a second safety message of the second safety message type from a leader UE associated with the cluster of UEs within a duration of time.

* * * * *